US012062013B1

(12) United States Patent
Zhu et al.

(10) Patent No.: US 12,062,013 B1
(45) Date of Patent: Aug. 13, 2024

(54) AUTOMATED PLANOGRAM GENERATION AND USAGE

(71) Applicant: Grabango Co., Berkeley, CA (US)

(72) Inventors: Shirley Zhu, Berkeley, CA (US);
Theophile Dalens, Albany, CA (US);
Ryan L. Smith, Berkeley, CA (US);
Antoine Sailou, Berkeley, CA (US);
William Glaser, Berkeley, CA (US)

(73) Assignee: Grabango Co., Berkeley, CA (US)

( * ) Notice: Subject to any disclaimer, the term of this patent is extended or adjusted under 35 U.S.C. 154(b) by 132 days.

(21) Appl. No.: 17/322,632

(22) Filed: May 17, 2021

Related U.S. Application Data

(60) Provisional application No. 63/025,568, filed on May 15, 2020.

(51) Int. Cl.
| | | |
|---|---|---|
| G06Q 10/087 | (2023.01) | |
| G06F 16/23 | (2019.01) | |
| G06K 7/14 | (2006.01) | |
| G06K 19/06 | (2006.01) | |
| G06N 3/04 | (2023.01) | |
| G06N 3/08 | (2023.01) | |

(52) U.S. Cl.
CPC .......... *G06Q 10/087* (2013.01); *G06F 16/23* (2019.01); *G06K 7/1417* (2013.01); *G06K 19/06037* (2013.01); *G06N 3/04* (2013.01); *G06N 3/08* (2013.01)

(58) Field of Classification Search
CPC .... G06Q 10/087; G06F 16/23; G06K 7/1417; G06K 19/06037; G06N 3/04; G06N 3/08
See application file for complete search history.

(56) References Cited

U.S. PATENT DOCUMENTS

| 10,007,964 | B1 * | 6/2018 | Calhoon | G06V 10/44 |
|---|---|---|---|---|
| 10,176,514 | B1 | 1/2019 | Chen et al. | |
| 2019/0156277 | A1 | 5/2019 | Fisher et al. | |
| 2020/0215698 | A1 * | 7/2020 | Bogolea | B25J 9/1664 |
| 2020/0265494 | A1 | 8/2020 | Glaser et al. | |
| 2020/0286032 | A1 * | 9/2020 | Bogolea | H04N 23/60 |

OTHER PUBLICATIONS

U.S. Appl. No. 16/895,782, filed Jun. 8, 2020, Glaser et al.
Wei, Y., Tran, S., Xu, S., Kang, B., & Springer, M. (2020). Deep learning for retail product recognition: Challenges and techniques. Computational Intelligence and Neuroscience : CIN, 2020 doi:http://dx.doi.org/10.1155/2020/8875910 (Year: 2020).

* cited by examiner

*Primary Examiner* — Paul Danneman
(74) *Attorney, Agent, or Firm* — Alpine Patents LLC; Brian Van Osdol

(57) ABSTRACT

A system and method applying store operational data for automated product location tracking within an environment can include collecting operational data with item identifier information, generating item event location data through a sensor monitoring system, processing the operational data and establishing a candidate item location dataset using item event location data associated with the operational data, and translating the candidate item location dataset into an item location map. Variations of the system and method can integrate with product scanning events and/or transaction data.

16 Claims, 22 Drawing Sheets

At a point of sale (POS) terminal device, reading (scanning) a product product identifier (e.g., scanning a machine readable code) S212

Communicating, to a computing device of an inventory monitoring system, a transaction log that includes the product identifier and a timestamp S214

Collecting image data S222

Detecting, using a computer vision processing model, product event location data S224

Identifying a set of product shelf events in the image event location data that satisfy an association condition for the transaction log S232

Storing the set of product shelf events as probable location points of the product identifier in a candidate product location dataset S234

Translating the candidate product location dataset into a product location map S240

FIGURE 7

At a product scanning device, reading a product product identifier (e.g., scanning a machine readable code) S312

Communicating, to a computing device of an inventory monitoring system, the product identifier as part of a product scanning event S314

Collecting image data during a defined product locating time window of the product scanning event S322

For the scanning event, detecting, by processing the image data using a computer vision processing model, a product shelf event S324

Adding, to a candidate product location dataset, a probable location marker associating a location of the product shelf event to the product identifier S332

Storing the set of product shelf events as probable location points of the product identifier in a candidate product location dataset S334

Translating the candidate product location dataset into a product location map S340

FIGURE 8

Item Pickup Events

Time: 2:15
Customer: Ksd0-2839
Loc: (section-6, 23.3, 30)

Time: 2:40
Customer: 94JA-S093
Loc: (section-2, 8, 14)

Time: 2:42
Customer: 3022-902s
Loc: (section-3, 40, 2)

Time: 2:42
Customer: kf02-Z03z
Loc: (section-5, 17, 9)

Time: 2:43
Customer: 94JA-S093
Loc: (section-1, 12, 41)

Time: 2:47
Customer: 283b-Vmk7
Loc: (section-10, 24, 37)

Time: 2:58
Customer: 203r-T589
Loc: (section-3, 95, 28)

Time: 3:04
Customer: 304U-uyY7
Loc: (section-3, 58, 26)

Transaction Data

Receipt: 304ksj3
Customer: 94JA-S093
Items: [
 ACME O Cereal,
 2% Organic Milk,
 Farmer Leo AA Eggs]

Candidate Location Dataset

. . .

Item: ACME O Cereal
Candidate Locations: [
 (section-2, 8, 14),
 (section-1, 12, 41)]

AUTOMATED PLANOGRAM GENERATION AND USAGE

CROSS-REFERENCE TO RELATED APPLICATIONS

This application claims the benefit of U.S. Provisional Application No. 63/025,568, filed on 15 May 2020, which is incorporated in its entirety by this reference.

TECHNICAL FIELD

This invention relates generally to the field of tracking inventory, and more specifically to a new and useful system and method for applying operational data to automated product location tracking within an environment.

BACKGROUND

Recent trends have seen increasing use of computer vision and other forms of machine learning in the retail space. For these systems, dedicated training of computer vision models for the detection and identification of products is necessary to detect the products in the retail space. Many existing solutions use time-consuming product on-boarding processes that require products to be individually scanned using complex scanning setups so that a computer vision model is trained to detect the product. This process is expensive and time consuming.

Another solution is to leverage a planogram, which functions as a map of product locations within a store. Creating the planogram usually involves a lot of manual work. Traditionally, such "product maps" were designed and then left to stores to implement and maintain. However, keeping a planogram up to date can be challenging and error prone. The actual layout of a store would differ significantly from a planogram. Traditional planograms and even more modern technology enabled planograms fail to accurately reflect the true location of inventory throughout an environment.

These solutions also fail to realistically address the challenges of identifying products in a real retail setting where product inventory can include tens of thousands of different products and will regularly change with the introduction of new products and changes in packaging of products and the shifting of stocking layouts.

Thus, there is a need in the computer vision field to create a new and useful system and method for applying store operational data for automated product location tracking within an environment. This invention provides such a new and useful system and method.

BRIEF DESCRIPTION OF THE FIGURES

FIG. 7 is a detailed flowchart representation of processes of a variation of a method.

FIG. 8 is a detailed flowchart representation of processes of a variation of a method.

FIG. 10 is a schematic representation of creating a candidate location dataset using customer scoping.

DESCRIPTION OF THE EMBODIMENTS

The following description of the embodiments of the invention is not intended to limit the invention to these embodiments but rather to enable a person skilled in the art to make and use this invention.

1. Overview

A system and method for applying store operational data for automated product location tracking within an environment functions to map one source of product identifying empirical data onto sensor-detected information from various locations in an environment. In particular, the system and method are used with a computer vision based system such that product identifying empirical data is mapped to image-detected information. The system and method have applications in enabling a new and useful digital sensor-enabled system for generating a product location map that is dynamic, self-updating, and automated.

The system and method can establish a set of candidate associations between individual records in the empirical data source and image-detected information. These candidate associations may be noisy with many false associations. With sufficient empirical data, multiple instances of the same type of empirical data records can amplify true associations.

The system and method can be used for on-boarding and maintaining a product location modeling of an environment for computer vision applications or other digital services/interactions. Generally, the system and method analyze patterns between confirmed data input like transaction data from a point of sale (POS) system or from a product scanning device and adjacent or related image-based observations. In one preferred application, the system and method can be used in a retail environment to create a planogram of product placement throughout the retail environment using one or more store data input sources and one or more collection of image-based observations.

Figure 1:
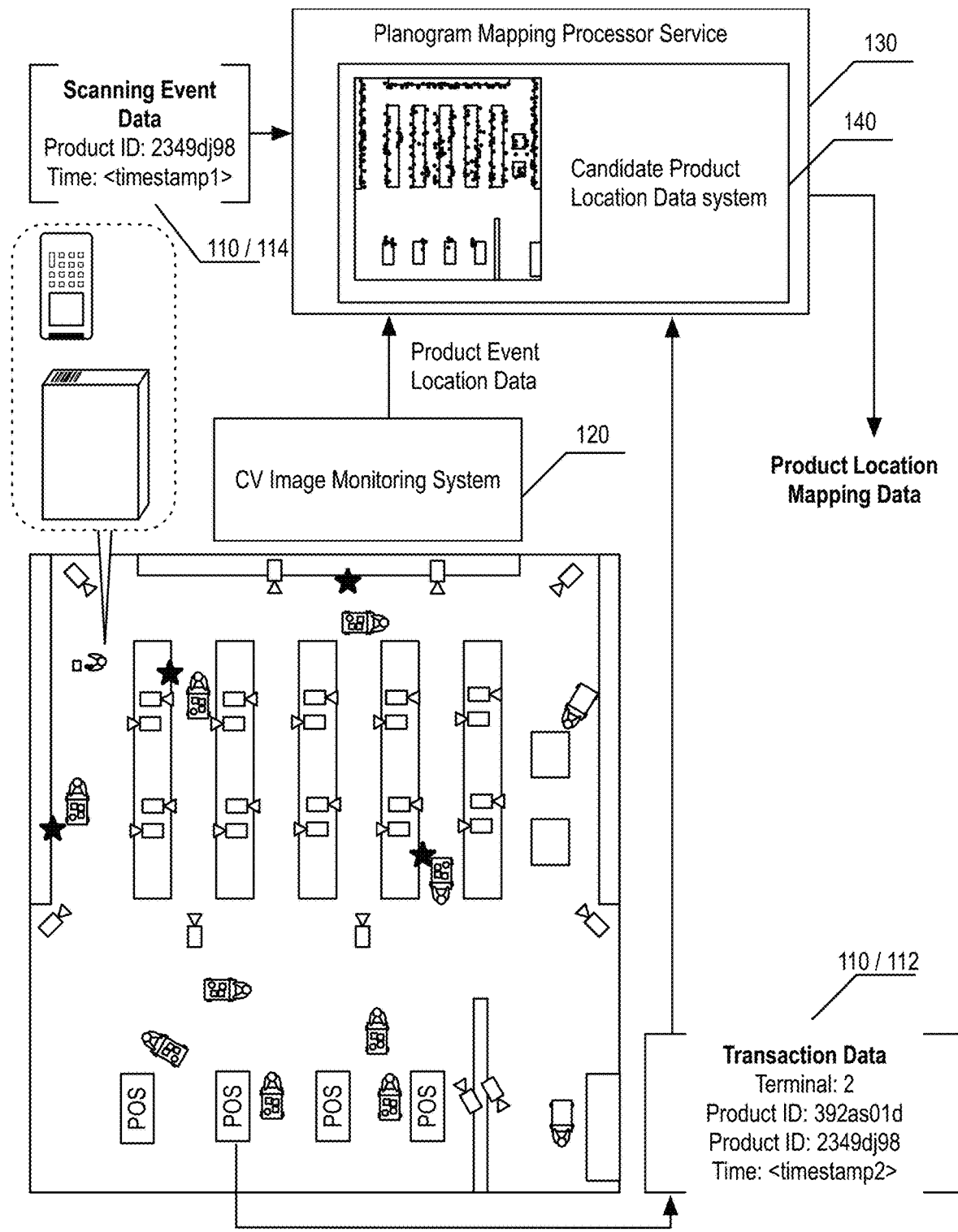
FIG. 1 is a schematic representation of a system for automated product location tracking within an environment using various empirical data sources.

The system and method can use store data input that is highly accurate at identifying products and which may be fully independent of any computer vision or image processing. The system and method can use store operational data like transaction data (e.g., transaction and receipt data) from a store's POS system, stocking data from when workers stock the shelves, and/or other store data inputs specifying product identifiers as shown in FIG. 1. The system and method may then compare this empirical data source to a computer vision (CV) based observations such as customer paths, customer interaction events, detected changes in product shelving, and/or other CV-based observations. With sufficient observation, the system and method can detect patterns between occurrences of specific product identifiers and the location of CV observations.

The variation leveraging transaction logs highlights the system and method capabilities of using empirical data from events removed temporally and spatially from the actual placement of the products.

The system and method may additionally or alternatively use store operational data originating from product scanning at or near the storage location of products. In this way, the system can automate a process by which product location information can be recorded by combining scanning a product identifier (using a product scanning device) and detecting some event related to the location of the scanned product (e.g., placing the product on the shelf).

The system and method may be applied to translate a dataset of candidate product locations into a product location map that can be used in enabling a wide variety of unique capabilities of a computing system. A real-time and high accuracy product location map has not existed as a feasible and cost-effective tool.

As one example, the product location map can be used in enabling a dynamic and self-update map (which can be used for consumer map tools, for worker-directed store maps, and/or for maps used by mobile robotic devices).

As another example, the product location map can be used for dynamic mapping directions within a retail environment. Customers, workers, and/or robotic devices could be directed towards locations of products in an environment with higher accuracy.

As another example, the product location map can be used for inventory alerts such as out of stock alerts, misplaced item alerts, alignment with product layout objectives, and the like.

As another example, the product location map may enable highly accurate 3D product mapping capabilities within a retail environment. This may be used in combination with augmented reality (AR) computing devices to enable various AR or other types of digital experiences based on relative position of a device (or user) with the products. For example, product information can be overlayed as an augmented reality layer, where positioning of the overlay is based in part on the product location map.

As another example, the product location map may be used in various CV-based applications. CV-based applications can include store monitoring services, operational-focused applications, customer-focused applications, and/or other forms of CV-based applications.

In particular, the system and method may address a number of challenges involved in building computer vision based interaction applications. In particular, the system and method can be used for CV interaction applications for large environments like retail spaces. The system and method can help with the cold start problem of enabling CV-based services such as automated checkout, accelerated checkout, inventory management, and/or other CV-based applications. A retail environment like a grocery store will have thousands of different products, some of which may have no prior image data. Use of the system and method can speed up the on-boarding process for making the CV-based service operational within a new environment.

The system and method are preferably used in a retail environment. A grocery store is used as an exemplary retail environment in the examples described herein. However, the system and method are not limited to retail or to grocery stores. In other examples, the system and method can be used in supermarkets, department stores, apparel stores, bookstores, hardware stores, electronics stores, gift shops, and/or other types of shopping environments. Preferably, the system and method are used in combination with a sensor-based monitoring system used for automated or semi-automated checkout such as the system and method described in U.S. patent application Ser. No. 15/590,467, filed 9 May 2017, which is incorporated in its entirety by this reference. However, the system and method may be implemented independent of any automated checkout process. The system and method may also be adapted for other applications in environments such as warehouses, libraries, and/or other environments. In this way, the system and method may be used for tracking locations of any suitable type of item or object and is not limited to only products. In general, the items tracked will have some empirical data associated with them which may be empirical data such as an item identifier, but could be any suitable type of empirical data such as an item property.

Figure 2:
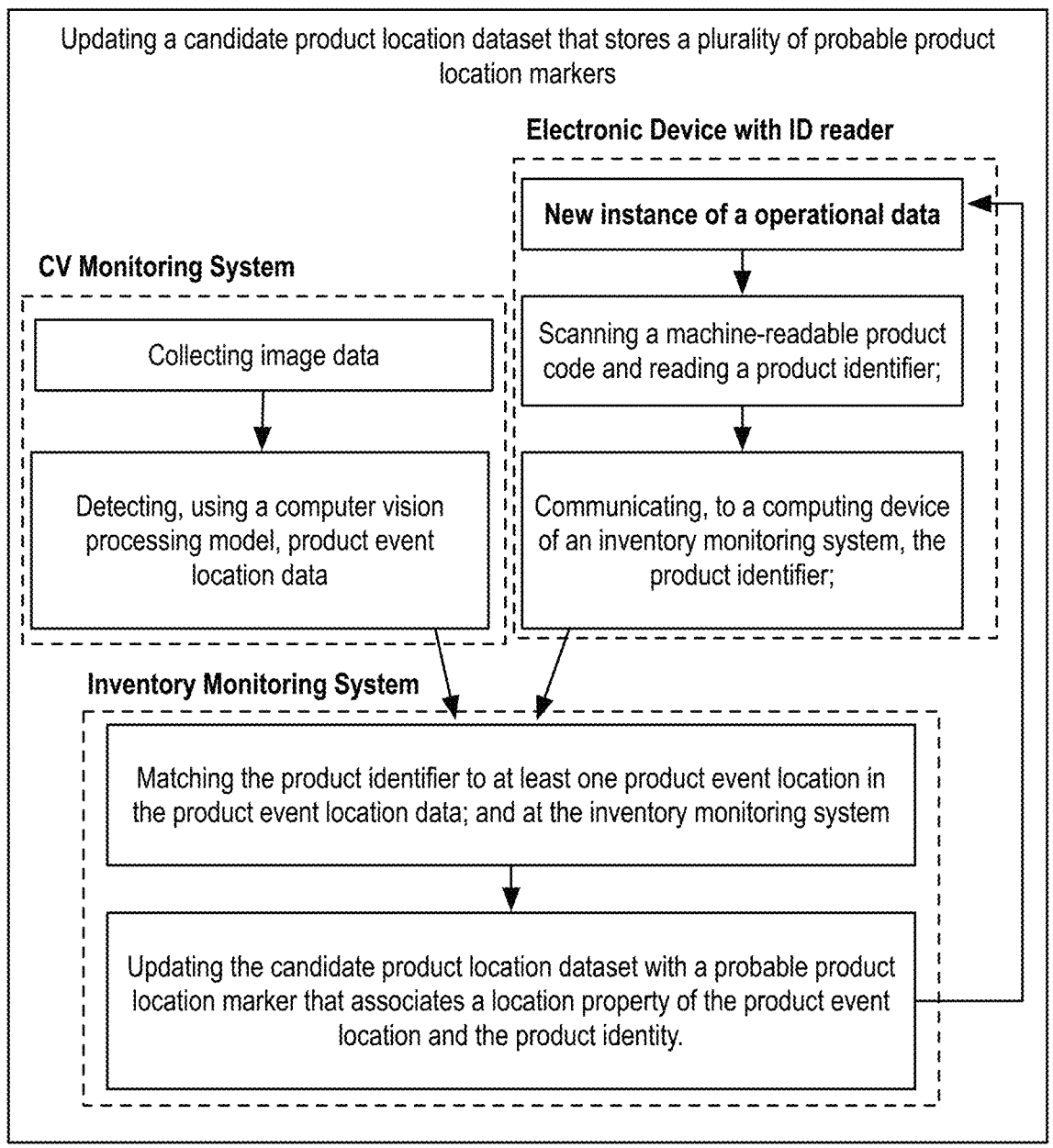
FIG. 2 is a flowchart representation of method constructing a candidate product location dataset from communicated operational data sources and transformed into product location tracking output.

The system and method are preferably implemented in a way where a candidate product location dataset is progressively and repeatedly updated with candidate association data records relating product identifier information from empirical data sources (e.g., a product identifier scanned during a checkout event or product scanning event) and an image-detected location information. The candidate association data records are referred to herein as probable location markers (e.g., data points). A product location map is produced by analysis of a collection of such probable location markers. For example, as shown in FIG. 2, the system and method may involve progressively updating a candidate product location dataset that stores a plurality of probable product location markers, which comprises multiple instances of: at an electronic device, scanning a machine-readable product code and reading a product identifier; at the electronic device communicating, to a computing device of an inventory monitoring system, the product identifier; at a set of imaging devices, collecting image data, wherein the set of imaging devices are configured to capture a field of view that includes product storage locations;

detecting, using a computer vision processing model, product event location data at the product storage locations; at the inventory monitoring system, matching the product identifier to at least one product event location in the product event location data; and at the inventory monitoring system, updating the candidate product location dataset with a probable product location marker that associates a location property of the product event location and the product identity. When sufficient candidate product location markers are updated, the system and method may then translate the candidate product location dataset into a product location map.

In one preferred implementation, the system and method use receipt data from the store. The receipt data may be collected as transaction log indicating a product identifier for each item purchased. The system and method can then use image-based analysis using computer vision and/or human-assisted labeling to establish a path through the store for the customer responsible for a transaction. These locations can be associated with the product identifier. With analysis of multiple purchases of a product, the customer paths will have overlaps near location(s) of the product in the store. This may be used to generate a map of the store where products are located.

In a related implementation variation, the system and method can use image data where user-item interactions like item-pickup events are labeled. They may be detected and labeled with shelf location information. For a given product identifier in the receipt data, location data from one or more selected user-item interactions can be modeled as a candidate location. The selected user-items interactions can be selected based on temporal conditions (e.g., occurring within a defined time window prior to the purchase of an item) and/or customer/agent conditions (e.g., user-item interaction involves the customer associated with a particular receipt). As in the other implementation with analysis of sufficient receipt data, the actual location of the products can be amplified and false candidate location information deamplified and ruled out. This may be used to automate generation of a planogram specifying specific shelf locations of the store.

As a related implementation variation, the system and method may also use detected changes in product storage in a shelf as a source of location data. These changes may also allow specific regions on a shelf and image data of a product from that region to be identified. As in the user-item interactions, location data from one or more detected changes can be modeled as a candidate location for a given product item transaction, and with sufficient receipt data the true locations can be detected through analysis of the candidate locations. This may be also used to automate generation of a planogram specifying specific shelf locations of the store. This approach because of the automatic detection of product image data can further be used in training a computer vision model for product identification.

Other implementations may use alternative or additional sources of empirical data like data from stocking activities. A worker may be required to scan items as part of an inventory tracking process when they stock items on the shelf. The time and optionally location information from this stocking activity can similarly be used to establish candidate associations with changes detected through collected image data. With sufficient data from multiple stocking events, possibly from multiple days of product stocking, the system and method can map product identifiers to specific locations in the store with high confidence. Continued monitoring of data can preferably resolve low confidence situations or situations where data is noisy. In one specific stocking implementation variation, a stocking procedure may map digital scanning of product barcode information to a computer vision detected product location. In one variation, a fiducial marker or other suitable CV detectable object/marker may be positioned at the shelf location for a product in coordination with scanning of the product. Such mobile product scanning variations can leverage existing stocking or inventory tracking procedures, but may additionally or alternatively serve as a method by which the product location map can be actively built or resolved. The method can automatically establish an association between the product identifier and the shelf location.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As a potential benefit, the system and method serve as an automated way to onboard all or at least a large portion of a store. A CV-based monitoring system can be on-boarded with no or little pre-existing data in a relatively short period of time. This may greatly accelerate the rate at which a CV-based monitoring systems for purposes of automated self-checkout, assisted checkout, and/or inventory tracking can be put to use in a store.

As another potential benefit, the system and method can be modified to work with different levels of computer vision capabilities. Some implementations can use asynchronous analysis of image data. With low latency CV capabilities, the system and method can additionally be made to update responsive to events as they happen.

As another potential benefit, the system and method can be integrated into normal operations of a retail environment. During on-boarding the normal POS checkout procedure can continue as normal, while the system and method builds out a product location map. Similarly, a worker performing routine stocking activities like stocking products, performing price updates, or product inventory, can be leveraged with digital integration with a product scanning device to map probable product locations.

As another potential benefit, the system and method can be a continuous process that is ongoing so as to continually update and dynamically respond to changing conditions. Product layouts change for a wide host of reasons. Similarly, the products sold by a store can change drastically. The system and method can flexibly adapt to such changes.

As another potential benefit, the system and method may be able to measure the state of the product location map. The confidence of the product mapping for the environment can be inspected through analysis of the product location map. Such inspection may, for example, report on the state of the accuracy or confidence of product location mapping as a whole, by location, and/or by product. Furthermore, in some variations, the system and method may trigger alerts as to changing conditions such that the "health" and/or capabilities of the product location map can be known and/or addressed.

As another potential benefit, the system and method can provide a dynamic and substantially real-time digital product location map. A substantially real-time product location map can be characterized as one that can feasibly be continually maintained to reflect daily or hourly state. The system and method can leverage continually occurring activities like checkout transactions and/or product stocking events in updating the product location map.

As another potential benefit, the system and method may enable product location mapping for a subset of products. With an ability to measure predictive capabilities, the system and method can be configured to provide product mapping capabilities for subsets of products based on the state of the underlying candidate product location dataset. In some variations, as data records in the candidate product location dataset are added and/or age, the system may enable or disable location predictions. For example, the product location mapping of a product may be enabled once a condition is satisfied where the probable location markers in the candidate product location dataset can meet some threshold of a confidence score in predicting location. Similarly, product mapping may be disabled when there are not enough probable location markers to accurately predict location (e.g., because the markers are not high enough in confidence or because they have expired).

2. System

As shown in FIG. 1, a system for applying store operational data for automated product location tracking within an environment can include at least one empirical data source 110 such as a transaction data source 112 or scanning event data source 114, an image monitoring system 120, a planogram mapping processor service 130, and a candidate product location data system 140. The planogram mapping processor service 130 and a candidate product location data system 140 may be part of an inventory monitoring system or other suitable computer system.

The empirical data source 110 functions as a data integration that can capture, read, or provide data access to various instances of collected empirical data. The empirical data will generally be a form operational data that includes one or more substantially verified product identifiers. The empirical data source will generally collect the data in connection with certain events which through computer vision can be associated with detected image-based conditions using the image monitoring system 120.

A transaction data source 112 functions to collect highly accurate product information. The transaction data source in one variation can include at least a subset of the checkout/POS terminals in the store including the worker-stationed POS stations and the shelf checkout stations. Transaction data can be retrieved from these terminals as purchases are made. The transaction data source may alternatively be a communication data interface to a database or other data repository recording the transaction data. The transaction data preferably includes transaction records that specify receipt information and/or the product identifiers of products purchased. Transaction records preferably include a timestamp property indicating the time the purchase. Transaction records may additionally include a location property indicating the location or terminal where the purchase occurred. This may be used in determining the customer or one or more people to consider as the potential customer responsible for the purchase. Transaction records may additionally include a customer identifier if, for example, the customer supplied loyalty card information.

In some implementations, the system may include the POS terminal devices. In other implementations, a data interface into transaction data, which was provided (at least in part) by such terminal devices may additionally or alternatively be used.

A scanning event data source 114 functions as data access to product identifiers that were selectively scanning during some operational activity such as when stocking products, taking inventory, updating pricing/signage, scanning to mark locations, and/or other suitable activities. A scanning event data is preferably generated by a mobile scanning device that includes wireless communication to a server of the system (e.g., the planogram mapping processor service 130) for recording and processing. Alternatively, the scanning event data could be stored on the scanning device and later uploaded or communicated to the planogram mapping processor service 130.

In some implementations, the system may include the product scanning devices. Alternatively, the system may alternatively interface with a scanning event data system that obtains scanning event data from such devices.

A product scanning device may include code scanning element such as a barcode scanner, QR scanner, NFC reader, RFID tag reader, or other suitable code readers. The product scanning device may additionally include a visual identifier which could be statically marked on the device, displayed within a display of the device, a light or other type of visual emitter exposed on the body of the product scanning device. The scanning devices may additionally include other elements to facilitate its use such as a user interface element. The user interface of the product scanning device may be used to deliver feedback to the operator, to direct stages of the product locating process (scan, initiate product locating time window, trigger detection of an identifier for product locating), and/or to perform other tasks.

An image monitoring system 120 of a preferred embodiment functions to transform image data collected within the environment into observations relating in some way to items and locations within an environment.

The image analysis preferably employs a form of CV-based processing wherein the image monitoring system 120 is a CV monitoring system. The image monitoring system 120 may additionally or alternatively use human-assisted labeling or other forms of semi-automated analysis of the image data.

The image monitoring system 120 may be used in tracking customer/person location, detecting user-item interactions (e.g., customer picking up an item for purchase), detecting changes in product shelving (e.g., a product was removed, moved, and/or placed on a shelf), and/or detecting other image-based information. The image monitoring system 120 will preferably include various computing elements used in processing image data collected by an imaging system. In particular, the image monitoring system 120 will preferably include an imaging system and a set of modeling processes and/or other processes to facilitate analysis of user actions, item state, and/or other properties of the environment.

The imaging system functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. In one example, a small environment may only require a single camera to monitor a shelf of purchasable items. The image data is preferably video but can alternatively be a set of periodic static images. In one implementation, the imaging system may collect image data from existing surveillance or video systems. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, in one implementation, the system could operate partially or entirely using personal imaging devices worn by users in the environment (e.g., workers or customers).

The imaging system preferably includes a set of static image devices mounted with an aerial view from the ceiling or overhead. The aerial view imaging devices preferably provide image data that observes at least the users in locations where they would interact with items. Preferably, the image data includes images of the items and users (e.g., customers or workers). While the system (and method) are described herein as they would be used to perform CV as it relates to a particular item and/or user, the system and method can preferably perform such functionality in parallel across multiple users and multiple locations in the environment. Therefore, the image data may collect image data that captures multiple items with simultaneous overlapping events. The imaging system is preferably installed such that the image data covers the area of interest within the environment.

Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous across the monitored portion of the environment. However, discontinuities of a region may be supported. Additionally, monitoring may monitor with a substantially uniform data resolution or at least with a resolution above a set threshold. In some variations, a CV monitoring system may have an imaging system with only partial coverage within the environment.

The planogram mapping processor service 130 functions to process image-based event data with the empirical data to output a product location map. The planogram mapping processor service 130 preferably includes one or more processes and one or more computer-readable storage mediums (e.g., non-transitory computer-readable storage mediums), wherein instructions are stored on the one or more computer-readable storage mediums such that when executed, the one or more processors process the empirical data and establish a candidate product location dataset using image event location data associated with the empirical data, and analyze and translate the candidate product location dataset into a product location map.

The candidate product location data system 140 is preferably a dataset or data model maintained within one or more data systems. The candidate product location dataset can include data records for multiple product types and, optionally, substantially all product types tracked in the environment (e.g., all products sold in the store). Here "substantially" may be characterized as a majority of product types. In many implementations, the method can build a dataset to more than 90% or 95% of products having data records pairing their product identifiers to a location. In some variations, substantially all product types may be a set of products selected for tracking and monitoring through the method. By way of example, different sizes and types of stores could have thousands, tens of thousands, or even more of different product types.

The candidate product location dataset can store data records to model locations of such volumes of different product types. Furthermore, the candidate product location data can store multiple data records for one product type for enhanced predictive capabilities. As such a candidate product location dataset, when being translated into a product location map for a store may have tens to hundreds of thousands and/or over a million data records (e.g., probable location markers) used in producing an updated and reliable product location map.

The modeling of the candidate product location dataset may generalize to addressing storage of a product in multiple locations, changes of product storage locations, introduction of product types, removal of product types, changing in the shelf space allocated to a product type, and/or other changes.

A probable location marker can be stored as a database record that stores or includes a reference to a location property and product identifier. A probable location marker may additionally include or reference a time property, a confidence score and/or another type of score, a location property, and/or other data that may be used in evaluating the marker when assessing product locations.

The format of the probable location markers may be stored in the dataset for vector/spatial calculations such that queries of the candidate product location dataset can find nearest neighbors, measure proximity, perform spatial averaging (e.g., mean, mode, median averages of product predictions in relation to a particular location), apply various forms of proximity filtering or proximity weighting, and/or perform other spatial calculations. The location markers may be indexed by location and product identifier for responsive search and analysis.

The planogram mapping processor service 130 may additionally operate on, inspect, analysis, maintain, or otherwise process and use the candidate product location data system 140 in producing a product location map or information related to assessed product location mappings.

The system may be used within other sensing systems that leverage sensed state of product locations provided by the system.

3. Method

Figure 3:
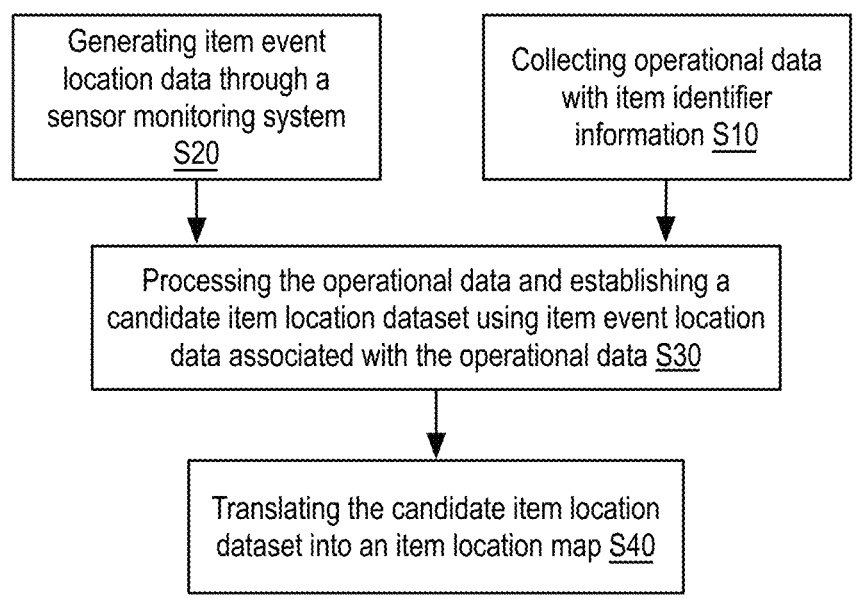
FIG. 3 is a flowchart representation of method for automated item location tracking.

As shown in FIG. 3, a method applying store operational data for automated product location tracking within an environment can include collecting operational data with item identifier information S10, generating item event location data through a sensor monitoring system S20, processing the operational data and establishing a candidate item location dataset using item event location data associated with the operational data S30, and translating the candidate item location dataset into an item location map S40.

The method functions to leverage patterns in occurrences between operational data (an empirical data source of item identifiers) and image-related data to determine a model of item locations within an environment.

The method coordinates operation of a specialized process involving at least two different data systems so as to create a dataset that maps empirical item identifier data to potential locations. The method preferably uses temporal, spatial, and/or user associations between the operational data and the item event location data to update a candidate item location dataset with data records of probable item locations. The candidate item location dataset can then be queried, processed, or otherwise transformed to be used an item location map. This may be used in better detecting items involved in user-item interactions, detecting changes or other item related placement changes, and/or other suitable applications such as those described herein.

The method may apply a variety of approaches for the combined processing of operational data and analysis of image data.

In one example, the method can be used in detecting patterns between the occurrences of purchases of a specific product as detected by receipt data and the location of product pick-up events in the store. This may be used for the purpose of labeling products at that location using the product identifying information from the receipt data.

In another example, the method can be used in automating detecting an associated product location when person scans a product in proximity to the product storage location.

The operational data is preferably collected at an electric device into which item information is entered. Generally, the electronic device will include a code scanner device such as a machine-readable code scanner device (e.g., a barcode scanner, QR code scanner, radio frequency identifier reader, and the like).

The item event location data is preferably collected from one or more sensor monitoring systems. Herein, the sensor monitoring system is primarily described as a computer vision monitoring system which operates on image data collected from the environment to detect location information related to items present in the environment. The system and method may be configured for use with other sensing components or systems such as smart shelving units (e.g., using digital scales, proximity sensors, etc.), radio frequency identifier (RFID) tracking systems, proximity sensors, and the like.

A CV monitoring system preferably involves collecting image data from one or more image sensors using processing of the image data using one or more CV processing models in detecting product event location data. The CV monitoring system can additionally be used in other aspects of the method such as detecting users in proximity to where operational data is created (e.g., identifying a shopper associated with a transaction) or detecting location of the scanning device.

The implementation of the method may depend on objectives and desired output of the method. The method may additionally be adapted to various capabilities of a CV monitoring system. In one exemplary variation, the method can use image event location data associated with specific storage location information to generate a planogram of the store identifying shelving location of specific products, which could be used for CV product identification, inventory tracking, and/or other objectives. In another variation, the method may use image event location data with coarser floor plan location information (e.g., 2D floor plan location) to generate a product map, which may be used by customers for finding a given product.

The method is preferably used in generating a product location map such as a planogram. In one implementation, the method may be used during an on-boarding process of a retail environment to automatically generate an initial product mapping in the store. In this variation, the method may be performed as an initialization process for launching a CV-based application within the retail environment. In another implementation, the method may be used periodically or continuously within an environment. For example, the method may be used selectively to resolve issues in a product location map, such as if the identity of a product at a particular location is unknown, if a product can't be identified (e.g., using a CV product classifier), and/or in response to other issues.

Figure 4:
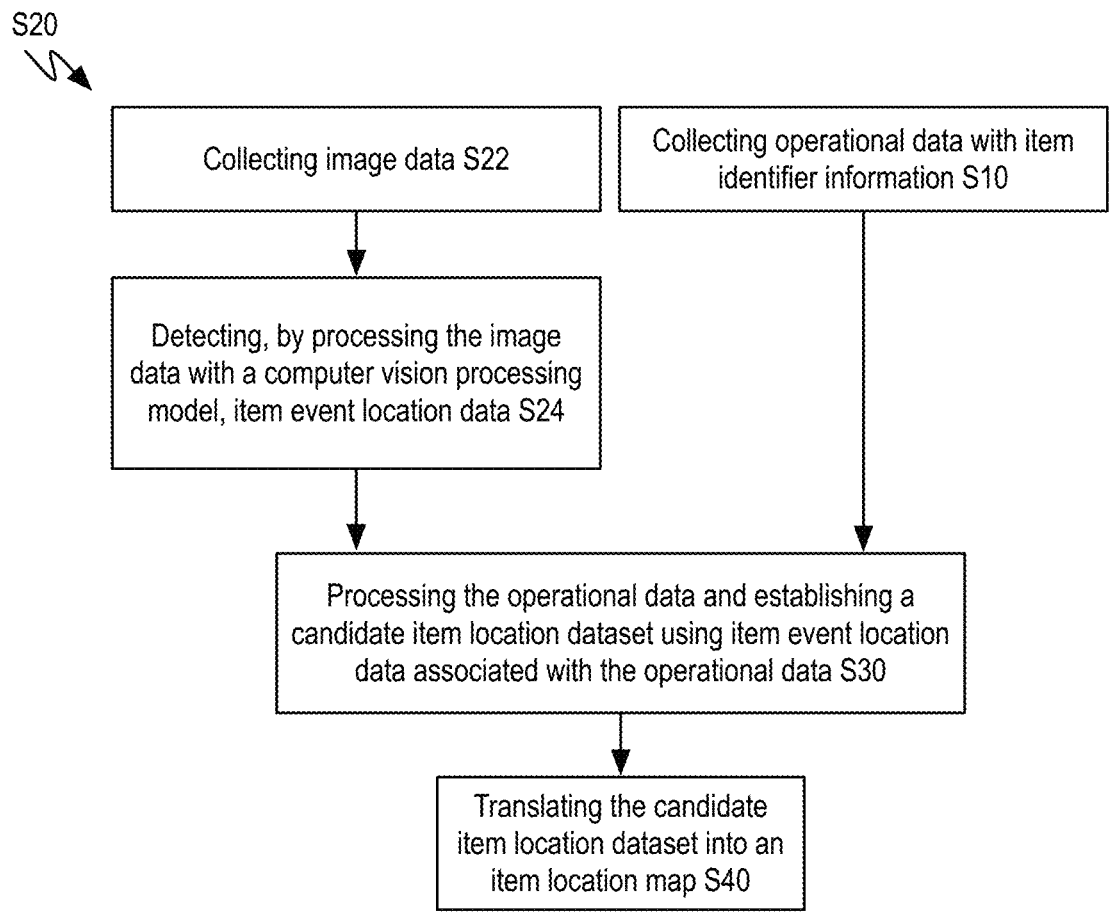
FIG. 4 is a flowchart representation of a variation of a method for automated item location tracking.

As shown in FIG. 4, in variations where the method uses a CV monitoring system, the method may include collecting operational data with item identifier information S10; generating item event location data through a computer vision monitoring system (S20), which comprises, collecting image data S22; detecting, by processing the image data with a computer vision processing model, item event location data S24; processing the operational data and establishing a candidate item location dataset using item event location data associated with the operational data S30, and translating the candidate item location dataset into an item location map S40.

The methods and systems described herein may be applied to any suitable type of item or object. The method and system may have particular applications in creating a map of where different products are stored within a store or shopping environment. Herein, references to product or use of a product as a descriptor may be used in place of item or object. The method and system are not limited to just products and may be used for any suitable type of items or objects, as would be appreciated by one skilled in the art.

Figure 5:
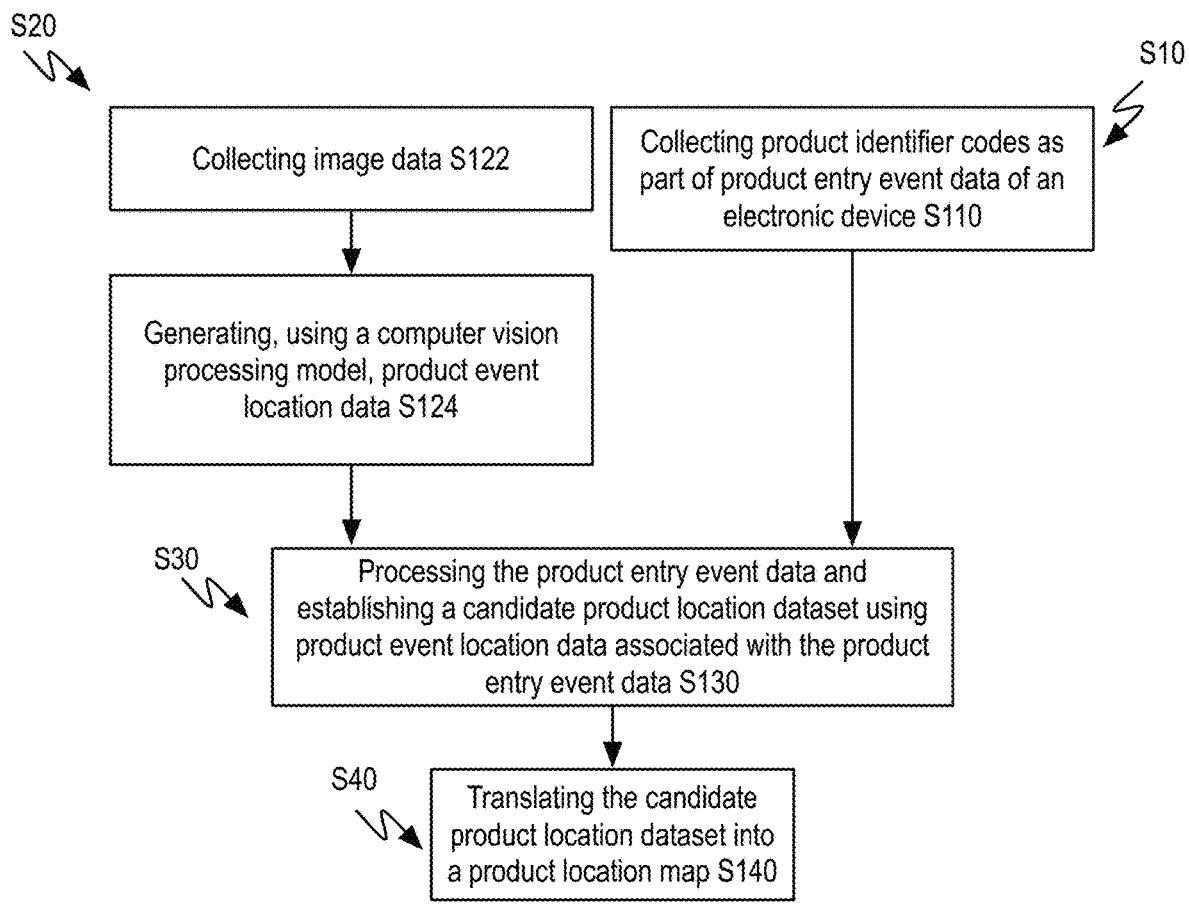
FIG. 5 is a flowchart representation of a variation of a method for automated product location tracking.

As shown in FIG. 5, a variation of the method applied to products, which may be stored/displayed at various places in a shopping environment, can include: collecting product identifier codes as part of product entry event data of an electronic device S110; collecting image data S122; generating, using a computer vision processing model, product event location data S124; processing the product entry event data and establishing a candidate product location dataset using product event location data associated with the product entry event data S130; and translating the candidate product location dataset into a product location map S140.

The method is preferably implemented such that the candidate product location dataset can be updated with multiple instances of paired product identifiers and location information based on product event locations.

In many instances, the candidate product location dataset will include data records for multiple product types and, optionally, substantially all product types tracked in the environment (e.g., all products sold in the store). Here "substantially" may be characterized as a majority of product types. In many implementations, the method can build a dataset to more than 90% or 95% of products having data records pairing their product identifiers to a location. In some variations, substantially all product types may be a set of products selected for tracking and monitoring through the method. By way of example, different sizes and types of stores could have thousands, tens of thousands, or more different product types. The candidate product location dataset can store data records to model locations of such volumes of different product types. Furthermore, the candidate product location data can store multiple data records for one product type for enhanced predictive capabilities. As such a candidate product location dataset, when being translated into a product location map for a store may have tens to hundreds of thousands and/or over a million data records (e.g., probable location markers) used in producing an updated and reliable product location map.

The modeling of the candidate product location dataset may generalize to addressing storage of a product in multiple locations, changes of product storage locations, introduction of product types, removal of product types, changing in the shelf space allocated to a product type, and/or other changes.

Additionally, the method preferably can collect multiple independent data records for the same type identifier. For example, one type of cereal (with a specific product identifier) may have multiple data records stored as probable location markers for that type of cereal—these data records may be cross-matched and used in predicting with high confidence (e.g., higher than 90%, 95%, or even 99% confidence) the location of the cereal.

Figure 6:
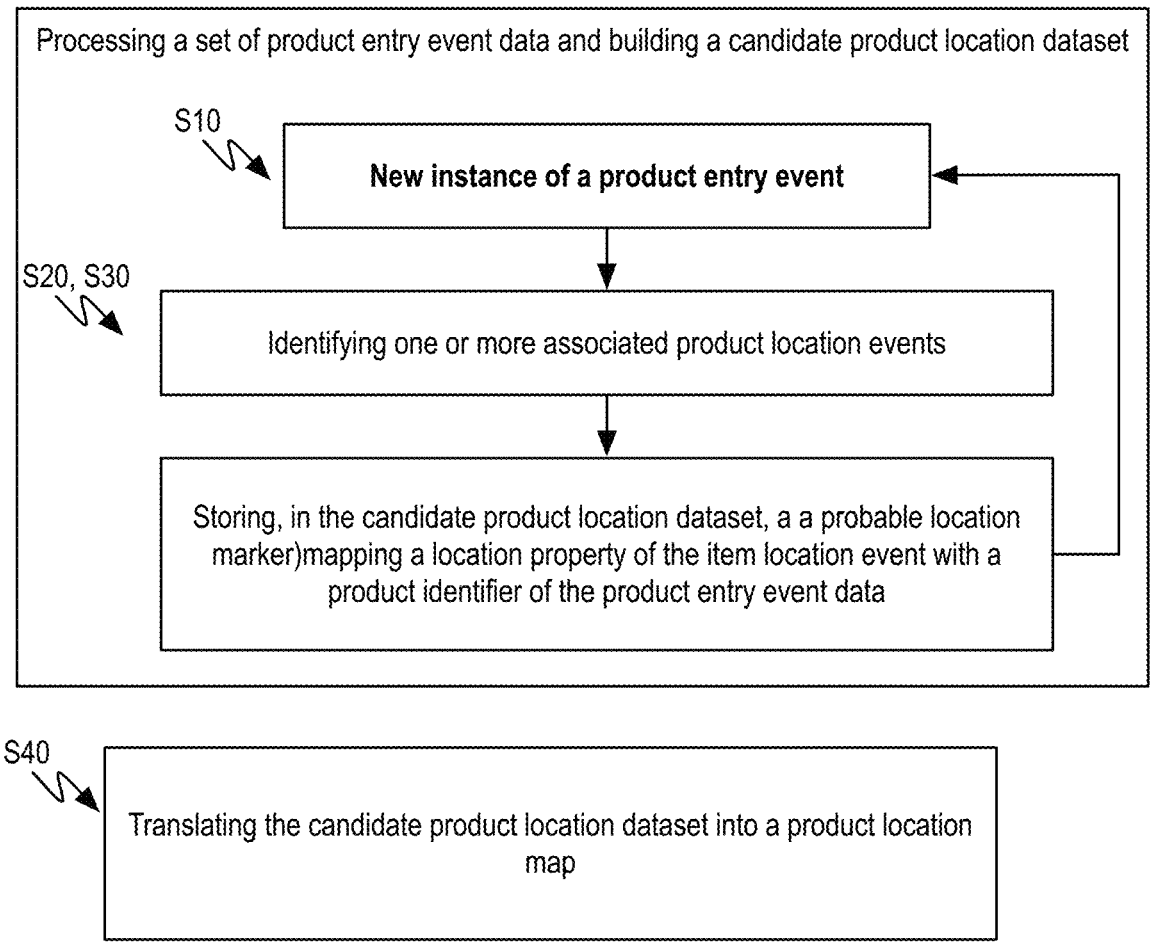
FIG. 6 is a flowchart representation of a variation of a method performed iteratively.

Accordingly, the processes of the method are preferably implemented in an iterative and repeated manner. As shown in FIG. 6, a variation of the method performed iteratively can include: processing a set of product entry event data and building a candidate product location dataset; wherein processing a product entry event data (i.e., an event instance of the set of product entry event data) comprises: identifying one or more associated product location events and storing, in the candidate product location dataset, a data record (e.g., a probable location marker) mapping a location property of the item location event with a product identifier of the product entry event data; and translating the candidate product location dataset into a product location map.

Processes S10 and S20 are preferably performed in connection with the method such that an iterative implementation of the method.

More specifically, as shown in FIG. 2, the method may include progressively updating a candidate product location dataset that stores a plurality of probable product location markers, which comprises multiple instances of: at an electronic device, scanning a machine-readable product code and reading a product identifier; at the electronic device communicating, to a computing device of an inventory monitoring system, the product identifier; at a set of imaging devices, collecting image data, wherein the set of imaging devices are configured to capture a field of view that includes product storage locations; detecting, using a computer vision processing model, product event location data at the product storage locations; at the inventory monitoring system, matching the product identifier to at least one product event location in the product event location data; and at the inventory monitoring system, updating the candidate product location dataset with a probable product location marker that associates a location property of the product event location and the product identity. When sufficient candidate product location markers are updated, the system and method may then translate the candidate product location dataset into a product location map.

In one variation, this iterative variation may be performed such that transaction event data generated by one or more POS terminal devices can be read and processed to match select items to corresponding product location events.

In another variation, this iterative variation may be performed, in one variation, such that transaction event data generated by one or more POS terminal devices can be read and processed to match select items to corresponding product location events.

The method may be implemented while incorporating one or more of the variations described herein.

A first exemplary implementation leverages data integration into transaction logs gathered by one or more checkout terminal devices (e.g., POS systems used for worker assisted scanning/code entry based checkout, self-checkout kiosks, and the like) in combination with sensor-based tracking of events that can be linked with individual. This implementation variation establishes associations between product identifying information in the transaction logs to event location data, where the event location data be associated with a location and time that is physically and temporally displaced from creation of transaction logs at a checkout terminal device.

A second exemplary implementation leverages receiving product identifying information gathered from operational data that occurs in proximity to item storage sites. This variation may incorporate more direct associations between extracted product identifiers and item locations using digital product scanners used during product stocking and/or inventory maintenance tasks.

As a third exemplary implementation, a method may be implemented that uses a hybrid of the two descriptions above as shown in FIG. 1.

Other alternative implementations may alternatively be used.

In a transaction log focused implementation, the method may be configured for leveraging transaction data and matching product identifiers from transaction logs to potentially associated product shelf events that were detected using computer vision (or other suitable sensor analysis). Transaction logs and product shelf events may be matched by one of a variety of association conditions. One exemplary association condition is when the transaction log and the product shelf event correspond to the same computer vision detected person. For example, a user detected in proximity to a POS terminal device at the time of the transaction log can be tracked and detected as being associated with one or more product shelf events. Other association conditions may also be used such as matching any product event within some time period as being associated with a product identifier of a qualifying transaction log and using the cumulative predictive capabilities of multiple markers in amplifying accurate locations and allowing inaccurate locations to be filtered as noise.

As shown in FIG. 7, a method variation for use with transaction data may include: at a point of sale (POS) terminal device, reading (scanning) a product identifier (e.g., scanning a machine readable code) S212; communicating, to a computing device of an inventory monitoring system, a transaction log that includes the product identifier and a timestamp S214; collecting image data S222; detecting, using a computer vision processing model, product event location data S224; identifying a set of product shelf events in the image event location data that satisfy an association condition for the transaction log S232; storing the set of product shelf events as probable location points of the product identifier in a candidate product location dataset S234; and translating the candidate product location dataset into a product location map S240.

Variations and detailed description of the methods and systems for such a variation are described herein.

In a product scanning focused implementation, the method may be configured for integrating with a product scanning device used when interacting with products near their storage location. Such a method variation can match product identifiers read or entered at a product scanning device to potentially associated product shelf events that are detected using computer vision (or other suitable sensor analysis) in association with a scanning event. In one exemplary implementation, a product is scanned (e.g., while stocking the product or during inventory tasks), this triggers a time window where changes in the image data in nearby product storage locations are associated with the scanned product identifier. Other alternative implementations can similarly be used.

As shown in FIG. 8, a method variation for use with scanning event data may include: at a product scanning device, reading a product identifier (e.g., scanning a machine readable code) S312; communicating, to a computing device of an inventory monitoring system, the product identifier as part of a product scanning event S314; collecting image data during a defined product locating time window of the product scanning event S322; for the scanning event, detecting, by processing the image data using a computer vision processing model, a product shelf event S324; adding, to a candidate product location dataset, a probable location marker associating a location of the product shelf event to the product identifier S332; storing the set of product shelf events as probable location points of the product identifier in a candidate product location dataset S334; and translating the candidate product location dataset into a product location map S340.

Variations and detailed description of the methods and systems for such a variation are described herein.

Block S110, which includes collecting product identifier codes as part of product entry event data of an electronic device, and its related variations function to access empirical data that includes some portion of information that the operator would like to map to location information. Preferably the empirical data includes or is a product identifier that can provide high confidence verification of the identity of a product. The empirical data is preferably connected in association with a specific item of the product (e.g., scanning barcode of a particular product) or a group of the item (e.g., scanning a barcode for a supply crate containing the particular product. The product entry event data may be a single event but more preferably is comprised of multiple instances comprising, at a first electronic device, collecting empirical product identifier data during product processing event.

The product entry event data is preferably a form of operational data that may result from various operational activities in the environment.

One variation of operational data can include transaction data, which can specify product identifiers for products purchased in a retail environment. The transaction data may be provided as a transaction log. The transaction data preferably specifies records with properties that include a timestamp and a product identifier. In some variations, transaction data is organized by receipt data that can include multiple product identifiers and a time stamp for the combined purchase of the listed products.

In another variation, the operational data can include product scanning event data, which can specify a product scanning event where a select product is read. In some variations or instances, the method can leverage product scanning event data when a product is scanned in proximity to the storage location of the product and some action, and, in connection with the scanning event, some visually detected event occurs in the storage location of the product so that the product identifier can be mapped to the location.

In many instances, collecting product identifiers includes scanning, reading, and/or receiving entry (e.g., keying in of a product identifier) the product identifiers into the electronic digital device. For example, scanning a barcode, QR code, or any suitable machine-readable code and reading into the electronic device the corresponding product identifier. Alternatively, collecting product identifiers could include product identifiers resulting from user entry or input. For example, in some cases, a worker may enter the numerical code of a product identifier if it can't be read. Collecting product identifiers alternatively include interfacing with a data source of operational data. For example, transaction logs stored by a set of POS terminal devices may be stored within a database, and the transaction logs may be retrieved using a data interface.

There may be one or more electronic devices used in supplying product entry event data. Additionally, there may be one or more different types of electronic devices used. The electronic device preferably includes a scanner or reader (e.g., a machine code reader like a barcode or QR code reader).

An electronic device may be a point of sale (POS) terminal device in the case where the product entry event data includes transaction data. The POS terminal device can additionally perform checkout transactions and collects the product identifiers as part of building a receipt for a checkout transaction, the information of which is stored as part of a transaction log.

An electronic device may be a product scanning device in the case where the product entry event data includes transaction data. A product scanning device may be a mobile code reading devices. The product scanning device may include wireless communication to a remote computing system (e.g., an inventory monitoring system).

The product scanning device may additionally include user interface input or outputs, which in some variations may be used to direct product locating processes or to provide feedback. In some variations, it may additionally interface with an inventory system, stocking system or other suitable system.

In many implementations, block S110 is implemented in connection with multiple electronic devices, each contributing to instances of different updates to the candidate product location dataset.

A product identifier may be any suitable code for a product. It generally will be an alphanumeric code that identifies a particular SKU item that is tracked and/or sold within the environment. The product identifier may be a code used by a point-of-sale system in identifying products and accessing product information. A product identifier could be a SKU (stock keeping unit) identifier, PLU (price look-up) code, a UPC (universal product code), an ISBN (International Standard Book Number), and/or any suitable type of product identifier.

The product entry event data will generally include a timestamp or other type of time property associated with a product entry event (e.g., time of a transaction log or a product scanning event).

The product entry event data may additionally include an association to a location. In a transaction related example, the POS terminal device location may be recorded and/or detected as part of the transaction log. In a product scanning example, the method may include detecting location of the product scanning device. This may involve using a location sensing element on the product scanning device (e.g., GPS, RF triangulation, or other forms of location sensing). This may alternatively include processing collected imaged data and detecting location of the product scanning device. In some instance the product scanning device may include a visually identifying marker (fiducial marker) or may emit an identifying signal.

In some variations, product entry event may additionally be associated with a person. In the case of transaction data, a transaction log may be associated with a customer identifier. The customer identifier may be associated with the receipt data based on a loyalty card, credit card information, and/or other customer associated information collected in association with a transaction. A person may alternatively be associated with product entry event by detecting, through processing of the image data, a user present in proximity to the site of the product entry event. For transaction data, the method may include using computer vision analysis of image data associated to detect a user (e.g., a customer) in proximity to the POS terminal device at the time of a checkout interaction that is associated with the transaction log.

Collecting the product entry event data, in one variation, is performed in a batch. The product entry event data or a subset of product entry event data can be accessed, retrieved, or otherwise obtained and then supplied to block S130 for processing. For example, weeks of transaction log data may be uploaded and submitted for processing.

Collecting product identifiers, in an alternative variation or instance, is performed in real-time or substantially real-time. Such a variation may responsively process product entry events as they happen. Herein, real-time can be characterized as a process of collecting transaction data in response to new transaction data. This variation may be performed when the system implementation includes communication integration with the checkout systems (e.g., the POS terminals) used within the retail environment.

This variation may be used for updating and refining product location map as data becomes available.

Collecting product identifiers as part of product entry event data is preferably performed as a parallel process to processing image data in block S120. While the collection of product identifiers data is used to organize data records to be used as an empirical data source, the processing of image data is used to find potentially related environmental information identifiable through image data or other sensing technologies. The processing of image data can be performed independent from collection of transaction data. The processing of image data may alternatively be responsive to and performed in connection with a specific product entry event. The sequence and ordering of processes involved in processing image data and collecting transaction data can be architected in a variety of ways.

The method preferably includes a generating product event location data through a computer vision monitoring system (S20), which functions to use sensor-based approaches to interpreting activity at product storage locations. The product event location data is derived from events (at a storage location of a product) that either naturally or artificially relate to a product entry event. For example, when an item is purchased, there is naturally some event where the product was picked up by a customer at some location in the store. In another example, a product scanning event may be used in connection with an artificially contrived event where the operator of the product scanning event performs some action that can be registered as the location of the just-scanned product.

Generating product event location data through a computer vision monitoring system can include collecting image data S122; and generating, using a computer vision processing model, product event location data S124.

Product event location data (alternatively characterized as image event location data) is preferably a data set stored within some data system that records detected image activity (changes, gestures, interactions, etc.) related to placement location of products in the environment. Product event location data can record different CV-detected events such as detected change in a storage location, detected user-item interaction, detected user within an interaction distance from items, detection of a location marker, or other CV detected events related to location.

In some implementations, various product events may be tracked continuously, and the resulting data set can be used by the method. Different product events may be detected across the environment. Furthermore, such events may occur simultaneous and at different locations.

Alternatively, some implementations, may perform image analysis in response to specific tasks. For example, select image data from an environment (e.g., from a specific camera, during a select time period) may be processed in response to some product entry event (e.g., scanning of a product).

Location information from a product event can be stored with an association to a time and location properties. The form of the location information can vary depending on implementation and objectives.

In one location variation, the location information can be image data location, wherein the location is specified as a location within image data of one or more cameras.

In another location variation, the location information can be spatial coordinates either within a global coordinate system, an environment global system, or relative to some other coordinate system. The spatial coordinates in some implementations, can be two dimensional (e.g., location within the footprint of an environment). three dimensional (e.g., location in 3D space).

In another location variation, the location information can be a descriptive location which may define the location according to a custom format. For example, location within an environment may be parameterized by how locations are specified in that environment (e.g., section, aisle, shelf, row, column, bin, space, and/or other suitable descriptors). For example, the location of some product may be analyzed and assigned a location descriptor of aisle 3, shelf two, column 5.

In one variation, the method may include marking storage units (e.g., equipment for storage like shelves, racks, or bins) with visual identifiers that can be recognized from processing the image data. These visual identifiers may mark different descriptive locations or may be used in defining a custom location coordinate system. In one implementation, shelves may be marked with an array of visual identifiers. Then the method may include detecting the array of visual identifiers and translating the arrangement and identity of the visual identifiers into a location grid used in assigning location properties for product events detected in the image data.

Block S122, which includes collecting image data, functions to collect video, pictures, or other imagery of an environment. The image data is preferably captured over a region expected to contain objects of interest (e.g., inventory items) and interactions with such objects. Preferably, time coverage of the transaction data and the image are for overlapping periods of time. Image data is preferably collected from across the environment from a set of multiple imaging devices. Preferably, collecting image data occurs from a variety of capture points. The set of capture points include overlapping and/or non-overlapping views of monitored regions in an environment. Alternatively, the method may utilize a single imaging device, where the imaging device has sufficient view of the exercise station(s). The image data preferably substantially covers a continuous region. However, the method can accommodate for holes, gaps, or uninspected regions. In particular, the method may be robust for handling areas with an absence of image-based surveillance such as bathrooms, hallways, and the like.

The image data may be directly collected, and may be communicated to an appropriate processing system. The image data may be of a single format, but the image data may alternatively include a set of different image data formats. The image data can include high resolution video, low resolution video, photographs from distinct points in time, image data from a fixed point of view, image data from an actuating camera, visual spectrum image data, infrared image data, 3D depth sensing image data, parallax, lidar, radar, sonar, passive illumination, active illumination, and/or any suitable type of image data.

The method may be used with a variety of imaging systems, collecting image data may additionally include collecting image data from a set of imaging devices set in at least one of a set of configurations. The imaging device configurations can include: aerial capture configuration, shelf-directed capture configuration, movable configuration, and/or other types of imaging device configurations. Imaging devices mounted over-head are preferably in an aerial capture configuration and are preferably used as a main image data source. In some variations, particular sections of the store may have one or more dedicated imaging devices directed at a particular region or product so as to deliver content specifically for interactions in that region. In some variations, imaging devices may include worn imaging devices such as a smart eyewear imaging device. This alternative movable configuration can be similarly used to extract information of the individual wearing the imaging device or other observed in the collected image data.

Block S124, which includes generating, using a computer vision processing model, product event location data, functions to generate image-based information from the image data. Generating product event location data can include performing CV processing of the image data and/or any other suitable type of automated image analysis. Generating product event location data may additionally include retrieving labeling of image data, which may include supplying image data to a human labeling tool for human-assisted labeling of the image data. Human labeling of the image data may be triggered by CV detected events such as detecting image data where a customer may be interacting with a product so that item-pickup events can be labeled with time and shelf-position of the item-pickup event.

Generating product event location data may be performed in real-time in response to the occurrence of some event like a person moving through an environment, a person performing some action, the state of a product on a shelf changing, and/or any suitable state of the image data. If transaction data is additionally collected and processed in substantially real-time, a product location map can be updated with low latency (e.g., accurate as of 5-15 minutes). Alternatively, generation of product event location data may be performed asynchronous to the occurrence of the related event. For example, image data may be collected and then transformed into product event location data at a later time.

The product event location data may use a variety of image-detected signals. Customer tracking, customer-item interactions, shelving changes, and/or detection of a shelf space indicator are four exemplary image-detected signals that may be used.

Various techniques may be employed in processing image data using computer vision processes or models such as a "bag of features" object classification, convolutional neural networks (CNN), statistical machine learning, or other suitable approaches. Neural networks or CNNS such as Fast regional-CNN (r-CNN), Faster R-CNN, Mask R-CNN, and/or other neural network variations and implementations can be executed as computer vision driven object classification processes or models that when applied to image data can perform detection, classification, identification, segmentation, and/or other operations. Image feature extraction and classification and other processes may additionally use processes like visual words, constellation of feature classification, and bag-of-words classification processes. These and other classification techniques can include use of scale-invariant feature transform (SIFT), speeded up robust features (SURF), various feature extraction techniques, cascade classifiers, Naive-Bayes, support vector machines, and/or other suitable techniques. The CV monitoring and processing, other traditional computer vision techniques, deep learning models, machine learning, heuristic modeling, and/or other suitable techniques in processing the image data and/or other supplemental sources of data and inputs. The CV monitoring system may additionally use human-in-the-loop (HL) processing in evaluating image data in part or whole.

In the variation with customer tracking, a customer (or more generally a person or "agent") is tracked within the environment. Tracking a customer can involve performing continuous tracking. Tracking a customer may alternatively involve periodic detection of location of a customer. Preferably, CV-based person tracking is used for tracking multiple people within the environment. Alternatively, human labeling can be used for manually associating one or more images of a person with an identifier. Customer tracking can be used to link particular potential product locations to a product identifier from an empirical data source.

In one implementation, a set of product locations may be generated for any location within some interaction distance from a user. For example, if a user walked down aisle 2 and 4 then all those storage locations may be marked as potential locations of the single product that they purchased which was identified in a transaction log.

In another implementation, customer tracking may be used to isolate the number of customer-item interactions to those that relate to a customer that is also associated with a transaction log. For example, only the item-pick up events detected for the user that was at the POS terminal device at the time of checkout may be selected in S130.

In a variation with customer-item interaction detection, generating image event location data can include processing image data with a customer-item interaction classifier model and detecting a customer-item interaction event. This can be used for detecting the occurrence of events like an item-pickup event, but may also be used for item-put-backs and/or other interaction events. The detection of a customer-item interaction event preferably determines the location within the environment where the interaction occurred. It may more specifically detect and specify 3D position or shelving position where the interaction occurred, which will presumably be where a product was stored. This may be used in tracking which products were selected a customer. In another variation, human-assisted labeling of image data may be used for detecting or labeling of customer-item interaction events or properties of such events. In some implementations, product shelf position may not be used, and location could be specified as a floor location, which functions as a 2D or 2.5D (e.g., when multiple floors) mapping of location.

In some implementations, additional sensors may be used in facilitating customer-item interaction detection. A second sensing system may trigger some item storage change at particular location. In some instances (such as product scanning variations), this may all that's needed. In variations, where association with a customer or user is used to link it to a corresponding product entry event, the CV monitoring system can then detect one or more users in proximity to the event location and track the user.

In another variation, generating image event location data can include processing image data and detecting changes in product shelving, which functions to detect when placement of a product on a shelf is changed. Detecting changes in a product shelving preferably detects the removal of a product, which can indicate an item-pickup event. Detecting changes in product shelving may additionally include item movement, placement, and/or other changes.

Detecting changes in product shelving may be performed independent of any customer tracking. Detecting changes in product shelving preferably implements a CV-base image processing sequence for monitoring the status of stored products within an environment. In one variation, processing of image data can include removing foreground objects of image data with product shelving, which may function to remove humans, carts, and/or other foreground obstructions. Removing foreground objects may include performing a time windowed averaging of image data. For example, averaging pixel values over five or 10 minutes will remove most customers browsing a store. Longer time windows may be used to also filter out foreground objects like dollys or other temporary objects that may be present in one location for longer durations. The result of removing foreground objects of the image data can be shelving isolated image data. Processing of the image data can then include a subsequent stage of detecting changes in the shelving isolated image data, where changes in shelving can be detected overtime. Accordingly, detecting product event location data may include removing foreground objects of the image data thereby forming background object image data, and detecting changes in the background object image data.

Detecting changes in product shelving may detect a region of the shelf where there was a change. In one variation, automated analysis of the image data can be used for classifying the shelving position so that location may be stated a more contextually relevant manner such as a labeling a location. For example, a location such as aisle 3, shelf 3, position 12 may be specified for where a change happened.

In connection with detecting changes in product shelving, image data of a product can be collected and stored at the region where a change occurred. The product image may be collected from image data prior to when a product was removed or after a product was placed. Once a product identifier can be associated with that position and product in block S150, the collected image data may be used in training a CV product classifier model. Similarly, product images extracted from the image data may be processed for various monitoring tasks (to detect potential changes in stocking) and/or validation tasks.

In a variation using product scanning event data (e.g., stocking data), generating image event location data can include processing image data and detecting a shelf space indicator. The shelf space indicator can be a physical marker recognizable by the CV system. In one variation, the shelf space indicator could be an object with a machine readable code or a distinct object recognizable by a CV system. In another variation, the shelf space indicator could be an active indicator that can be activated in connection with collection of stocking data. For example, in response to scanning of a new product, the shelf space indicator may activate signaling to a CV monitoring system that the location of the marker should be collected. The shelf space indicator may be positioned stationary. In another variation, the shelf space indicator may be used by a user to indicate a region of space associated with a product. For example, after scanning a product, a worker may wave the physical marker over the shelving space in which the product is stocked.

In one specific stocking implementation variation, a stocking procedure may map digital scanning of product barcode information to a computer vision detected product location. In one variation, a fiducial marker or other suitable CV detectable object/marker may be positioned at the shelf location for a product in coordination with scanning of the product. The method can automatically establish an association between the product identifier and the shelf location.

Block S130, which includes processing the product entry event data and establishing a candidate product location dataset using product event location data associated with the product entry event data, functions to coordinate pairing of product identifier(s) with one or more product event locations. Block S130, additionally functions to generate a dataset showing potential relationships between the product entry event data and image-detected product event location data.

The candidate product location dataset can model potential relationships between product identifiers (determined from product entry event data) and locations in the environment (determined at least in part from the image data). Accordingly, the candidate product location dataset will generally store locations in association with a product identifier. A candidate product location dataset is preferably comprised of a plurality of data records that associate location and a product identifier. Herein, the data records may be stored as probable location markers which are data points/predictors of potential locations for a product identifier as determined by an instance of pairing a product entry event and image-based event location.

The candidate product location dataset is a data model maintained within one or more data system. In one exemplary implementation, a probable location marker can be stored as a database record that stores or includes a reference to a location property and product identifier.

The format of the probable location markers may be stored in the dataset for vector/spatial calculations such that queries of the candidate product location dataset can find nearest neighbors, measure proximity, perform spatial averaging (e.g., mean, mode, median averages of product predictions in relation to a particular location), apply various forms of proximity filtering or proximity weighting, and/or perform other spatial calculations. The location markers may be indexed by location and product identifier for responsive search and analysis.

In some variations, the probable location marker can additionally store a time property, which may note the time when the marker associated with its creation. The time property maybe used in time weighting the marker when assessing product location predictions. The time property may be used for other uses as well such as expiring the marker after a certain time.

In some variations, the probable location marker can additionally store a confidence score or another type of evaluation score. The confidence score may signify the confidence in the prediction, which may be based on the conditions leading to its prediction. In some cases, such as a product scanning event, a resulting probable location marker can be of high confidence. In other cases, such as if a product identifier from a transaction log is potentially mapped to 4 potential locations, those may have lower confidence since, in most cases, only a single one of those locations would be correct. A confidence score could be used in weighting a marker's location predictive value during "clustering/consolidating" when outputting a product location in block S140.

In some variations, the locations may additionally or alternatively be scored in other ways (e.g., as an alternative version of a confidence score or as an additional score used in evaluation). The score could indicate a class of association. For example, some associations may be classified as a strong classification if there is a 1-to-1 correspondence between the image event location record and the purchase instance for product identifier or a weak classification if there are multiple possible image event location data records that may correspond to a purchase instance of the product identifier.

The probable location markers are preferably built up over multiple instances of different product entry events. In time, there are preferably multiple probable location markers for each product. For an environment with over ten thousand SKUs, this may result in over hundred thousand probable location markers that are continually updated.

In some implementations, a candidate product location dataset is stored for a specific environment. For example, each store can have its own candidate product location dataset. In some scenarios, such as for related stores with a similar layout plans, a candidate product location dataset may use a dataset of one or more stores or may merge datasets. This may be used in augmenting product location predictions using an outside environment candidate product location dataset. Such outside environment datasets will generally be weighted to deprioritize the impact of its probable location markers, but they could be used reinforcing or negating lower confidence location predictions in certain situations such when there is little data. For example, when a new cereal is introduced, a store A may have several instances where markers are added to indicate that it is stored in a cereal aisle. If a store B just received this new cereal, then it may more quickly provide high confidence predictions of storage in the cereal aisle.

The method is preferably robust against the candidate product location dataset including incorrect associations. With sufficient product entry event data that includes multiple observations of purchases involving the same product identifier, accurate associations of event location data and a products identifier can be amplified and incorrect associations deamplified during block S140.

Establishing candidate product location dataset using the product event location data associated with the product entry event data preferably includes identifying associated image-based product events for a particular product entry event (e.g., a segment of transaction data or a particular product scanning event). Temporal properties, customer-association properties, timing and/or location sequencing of events, and/or other techniques may be used for determining an association. Various systematic approaches to processing records of the product entry event data may additionally or alternatively be used in facilitating the identification of an association.

In some instances, a single product identifier from a product entry event data record will be matched to a location of a product event from the product event location data. In response, a single probable location marker can be added to the candidate product location dataset. In other instances, a single product identifier from a product entry event data record can be matched to multiple locations of different potentially related product events from the product event location data. In response, multiple probable location markers can be added to the candidate product location dataset. The confidence scores can be adjusted to reflect the uncertainty in mapping between product identifier empirical data and the location of the product related to that particular event (e.g., transaction or product scanning).

Transaction data and product scanning event data may be processed in various ways. However, exemplary approaches that may be useful for a particular type of operational data are described herein. However, such variations may be adapted and applied in other scenarios.

Transaction data may be processed to pair product identifiers (identified during checkout transaction data) to possible places where the items were located. The method can be configured to address the various challenges in making such pairings such as selective processing of transaction data and/or selective processing of product identifiers within receipts, batch processing (e.g., for identifying unions for shared product items), scoping or filtering product event locations by properties of a transaction, and/or other suitable techniques.

Processing the transaction data preferably includes individually processing records of the transaction data. In one variation, the transaction data is organized by receipts, where each receipt includes a set of product identifiers (one product identifier for each line item). These receipts (i.e., the transaction data) and the included product identifiers may be processed to associate one or more product event location data record with a product identifier.

In some variations, the receipts may be selectively processed for scenarios to isolate associations between a product identifier and image event location data records, which functions to strategically leverage situations where it is easier to determine strong associations. Receipts with particular characteristics may be processed because of the conditions of the receipt to better signal an association between a product identifier and image-based data. In this way, processing transaction data can include selectively processing a select transaction data record that satisfies a mapping condition. The mapping condition can be one or more different conditions.

In some variations, a select transaction data record may be selectively processed by one of a set of different mapping processes depending on the properties of the transaction data record. For example, a transaction data record of a checkout receipt with one product identifier never before processed may be processed differently from a second transaction data record of a second checkout receipt with 4 different products that have previously been seen multiple times.

In one exemplary implementation, records for single item transactions are selected for processing. Single item transactions may be used to better signal an association between some image-detected event and a product identifier. For example, if a customer associated with the purchase of one box of cereal is detected to perform only one item-pickup interaction, then the association between the product identifier of the box of cereal and the location of the item-pickup interaction will be a strong indicator of the location of the product.

In another exemplary implementation, receipts that include a set of products but with only one product that has no or low location data (e.g., few or low confidence probable location markers) may be processed since that product with little location data may be better located. Location data of other product identifiers can be used on the receipt to reduce potential product event location data records. As an example, a receipt may be processed that includes a first product with no location information and a second product with high confidence location information (based on previously determined location modeling). There may be two item-pickup interactions performed by the customer associated with the receipt. In this situation, one item-pickup interaction can be associated with the location of the first product with high confidence by eliminating the location of the other item-pickup interaction if it is at the expected location of the second product.

As another variation, selected collections of receipts may be processed in combination. For example, a set of receipts including a new product may be processed in combination. The union of locations for item-pickup interactions between those multiple receipts can be used to specify a candidate item location.

Establishing a candidate product location dataset using the product event location data associated with the transaction data preferably includes identifying associated product event location data for a given segment of transaction data, which functions to determine at least subset of product event location data records to link with one or more product identifier. In the case of transaction data, the candidate product locations can represent a noisy set of potential locations for different instances of a product being purchased. When the product event location data includes item-pickup events, this may be used to identify potential item-pickup events that could potentially have been associated with that product identifier. Patterns in timing and/or customer proximity are two preferred approaches for signaling an association. As discussed above, potential associations can be revised based on other information like known locations of other products on a receipt.

Identifying associated product event location data can be done using temporal scoping (i.e., using a temporal association) and/or customer scoping (i.e., using a customer association shared).

Figure 9:
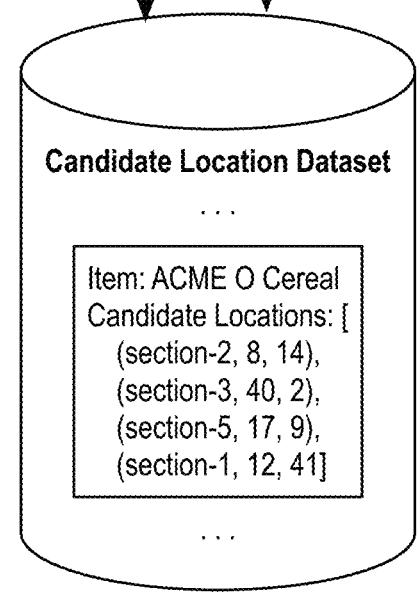
FIG. 9 is a schematic representation of creating a candidate product location dataset using temporal scoping.

Temporal scoping preferably identifies product event location data that satisfies a temporal condition for a given transaction record as shown in FIG. 9. In one implementation, identifying associated product event location data includes selecting image event location records that occurred within a defined time window before a transaction record. For example, a product purchase can be associated with all item pick up events that occurred 10 minutes before the purchase of the product. While this may include many inaccurate associations, multiple observations of purchases of the product can reveal high confidence predictions for product location during block S140.

Customer scoping (or more generally user scoping) preferably identifies product event location data that is associated with one or more customer (or other agent entity like a worker) that is associated with a transaction record. In one variation, customer scoping is used to associate image event location records that are associated with the same customer associated with a transaction record as shown in FIG. 10. CV or image labeling of image data can be used in matching a customer to a specific transaction record. For example, item pickup events for one customer may be used as candidate locations of a product purchased by that customer.

Figure 11:
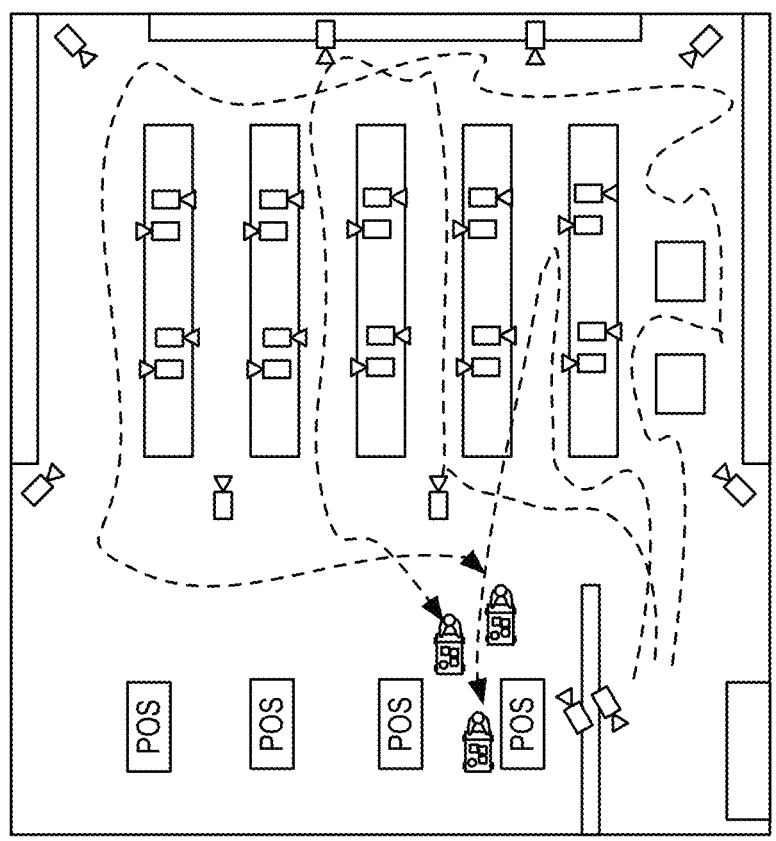
FIG. 11 is a schematic representation of using shopping events of multiple potential customers for a receipt.

Customer scoping can be extended to situations where a one-to-one mapping of person and transaction record is not available. As shown in FIG. 11, a set of people in the vicinity of where a transaction occurred may be considered as potential customers and all associated image event location records of those people can be mapped to one or more products of a receipt transaction.

Customer scoping may use person tracking to determine the set of associated image-detected events. Customer scoping could alternatively use instances of customer detection. For example, one implementation of the method may not involve tracking of customers but may instead detect and associate an identifier of a customer for each customer-item interaction. In this way, all customer item interactions can be determined for a given customer.

As discussed, different variations of the method may use different types of product event location data. Examples of product event location data can include customer location tracking data, customer-item interaction event data, and/or shelving change data.

Figure 12:
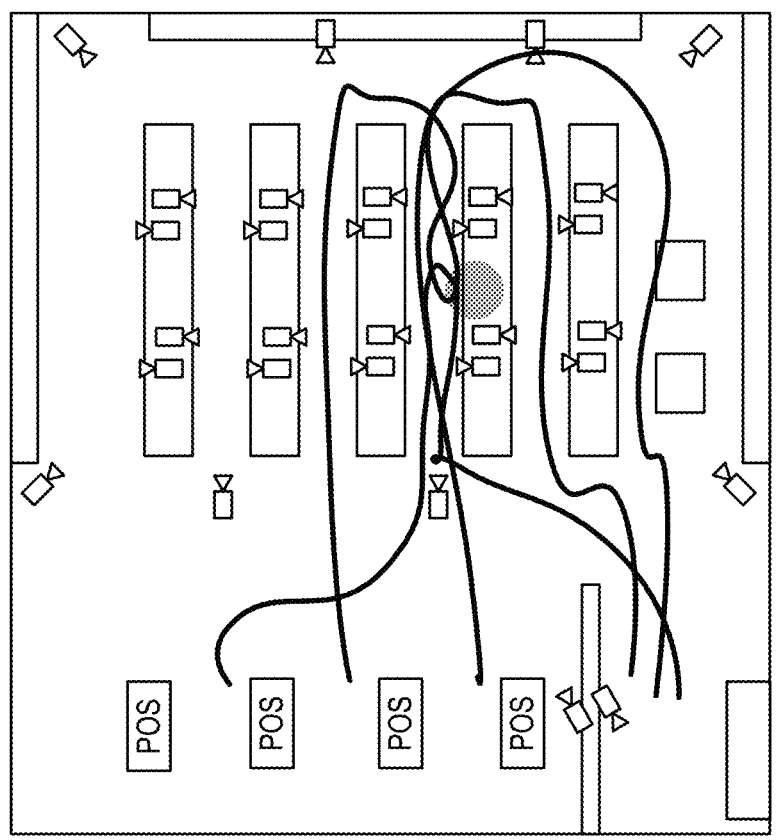
FIG. 12 is a schematic representation of using intersection of multiple customer paths.

In a variation with customer location tracking, all locations along a customer path may be stored as a candidate location for a product purchased by that customer. Customer scoped selection of customer paths is preferably used. As shown in FIG. 12, the overlap of multiple paths of customers purchasing one shared product can be a signal for the location of that product. As an exemplary scenario of this technique for identifying the location of a product using the intersection of customer paths, one customer purchases milk and a box of cereal, and a second customer purchases various other products and the same type of cereal. Any overlap of the paths of these two customers could be a candidate location for that type of cereal assuming the cereal is positioned in one location. If there is only one region of overlap, then that is a strong signal for the location of the cereal. Extending this exemplary scenario over many customers and many different transactions, the location of the cereal box could be determined with high accuracy even if that cereal is stored in multiple locations. In a description of data modeling implementation, a series of probable location markers for a product may be stored along the path (or alternatively, the path itself may be stored as the location property). During inspection of the candidate product location dataset, intersection of paths that share a common product identifier can indicate a likely location of the product.

Further analysis of the customer paths can be used to clean the data. In one variation, customer position and or motion that are unlikely to correspond to any product locations may be removed such as when the customer is walking down the middle of an aisle. This may be used to filter a customer path to positions when potential item interactions could happen.

In a variation with customer-item interaction events, labeled interactions like item-pickup events may be selected that have some potential relationship with a transaction record. In a temporally scoped variation, all item-pickup events within some time period can be associated with a product identifier. In a customer scoped variation, item-pickup events involving the customer associated with the transaction record may be associated with a product identifier.

In another variation with shelf change events, regions where there were changes in product shelving can be as selected as having a potential relationship with a transaction record. In a temporally scoped variation, all shelving changes that happen within some time period can be associated with a product identifier. In some variations, shelf changes at locations where the product can be automatically detected and/or where a product is mapped to that location with high confidence may be ruled out. If customer tracking is additionally used, then a customer-scoped association may be used where shelf change events can be considered if they happened when a transaction-associated customer was nearby at the time of the shelf change event. In this way, shelf changes far from the customer will not be candidate locations for a product identifier.

Alternative approaches may be used for processing product scanning events. In many scenarios of the product scanning event, the scanning of the product identifier occurs near the storage location of the product and is performed by someone who is performing some task related to the product or the location of the product, such as stocking the product, updating price information of the product, marking location of the product, and the like. In one example, such product scanning events may result from stocking data.

In a variation using product scanning event data, location information associated with a visual detection of an activity or an identifier can be used to ascertain the location of a product can be selected for association with scanned product information (e.g., using a barcode scanner). In this variation, a one-to-one association may be established based on sequence or timing of events (i.e., using temporal scoping).

Figure 13:
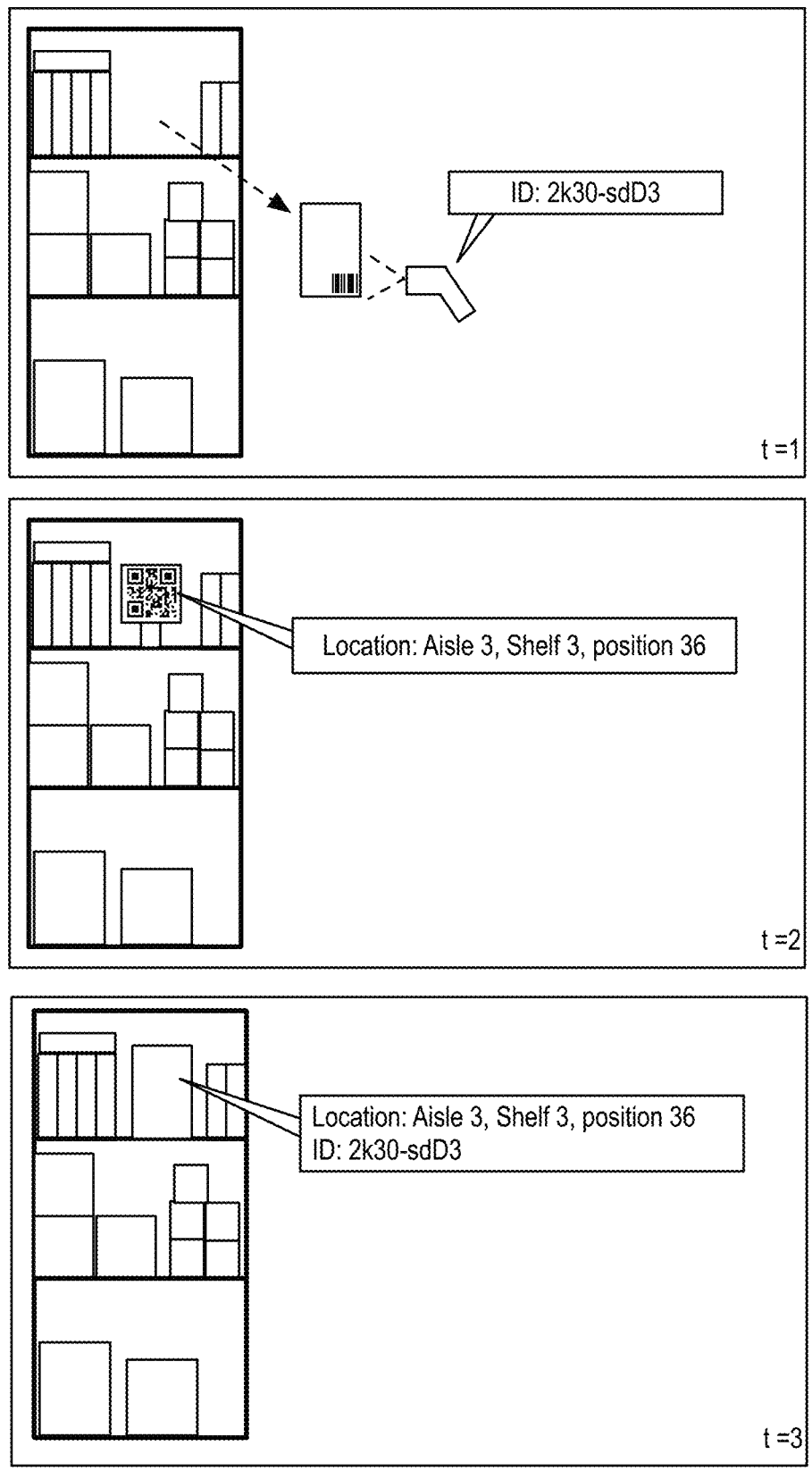
FIG. 13 is an exemplary implementation of the method used with stocking data.

In one implementation, shelf space indicator can be used as a visually detectable identifier. This could be a static identifier. It may also be the product scanning device itself. A worker following a standard stocking procedure using the shelf space indicator may facilitate matching of product identifiers to locations. As one example, a worker may place a shelf space indicator (a visually detectable signal) at a product's position on a shelf and then manually scan the associated product using a barcode scanner. The timestamp of the UPC scan can be paired to the location of automatically detected shelf space indicator at that time. As another example shown in FIG. 13, a worker can pick up an item and scan it, place the shelf space indicator on the item position, then replace the shelf space indicator with the product, and then move on to the next item. In one variation, multiple locations or a region of shelf space may be indicated. For example, a worker could scan a product and then place a shelf space indicator in multiple locations on a shelf. Each location captured can similarly be associated with the initially scanned product.

In a related variation, the method may automatically detect the location to associate with a product scanning event. This may be done by detecting a product event such as a pickup or place-back interaction/gesture, detecting a change in the product display image data (by analyzing background image data), and the like. For example, a worker may scan a product, then placing the product on the shelf during a time window after scanning may be detected because of a change in the image data of the shelved products.

In one variation, the method may include detecting location of the product scanning device at the time of a product scanning event. This may be used by using sensing location using GPS, RF triangulation, or other forms of location sensing. The location of the product scanning event may alternatively be detected and determined by processing image data and detecting the presence of the product scanning device. For example, a device visual identifier (passive or active) may be displayed and then detected.

Figure 14:
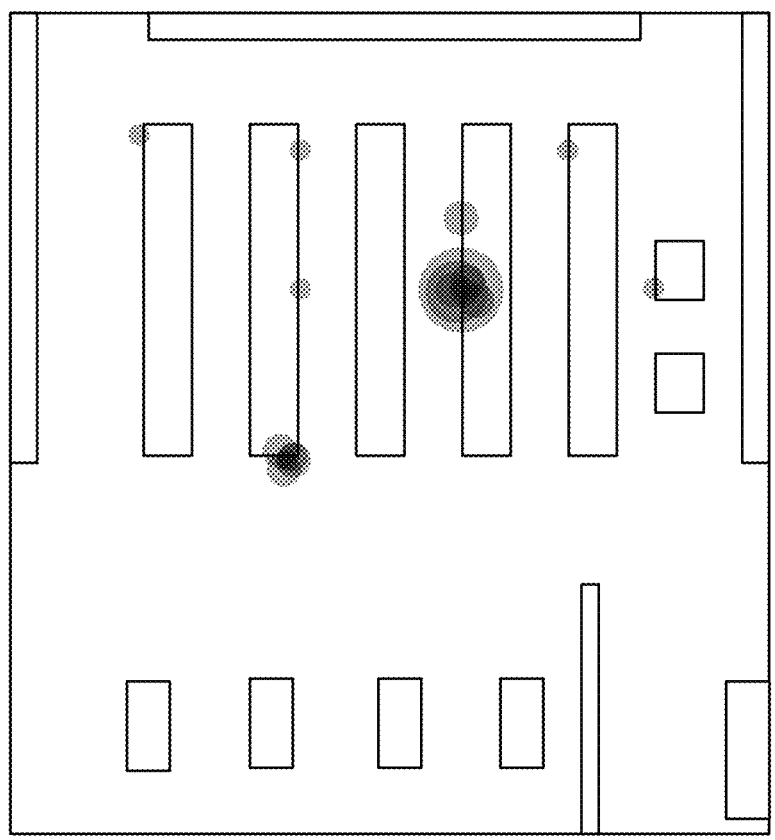
FIG. 14 a schematic representation of analysis of a collection of candidate location associations for a given product identifier to determine likely locations of the product across a store.
Figure 15:
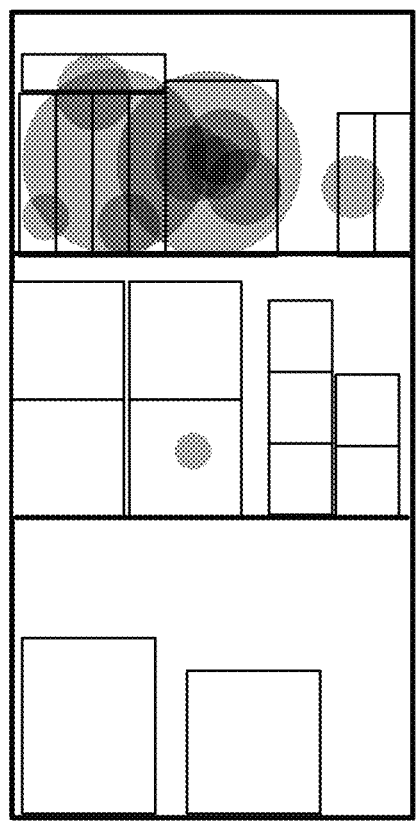
FIG. 15 a schematic representation of analysis of a collection of candidate location associations for a given product identifier to determine likely locations of the product on a shelf.

Block S140, which includes translating the candidate product location dataset into a product location map, functions to analyze the candidate product location data set to detect patterns. Translating the candidate product location dataset into a product location map preferably leverages analysis of candidate product location data from multiple, independent instances of processed operational data. Patterns in candidate product locations (stored in the form of probable location markers) from different transactions or product scans can indicate with high confidence that a location is associated with the product identifier. If a product is stored at two locations like if a type of cereal that's stored in the cereal aisle but also at a promotional endcap (at the end of another aisle), then both locations will be reinforced with sufficient instances of operational data as shown in FIG. 14. Candidate locations for a product can quickly be removed and not included in the product location map. In this way a product location map can be generated with high accuracy. As shown in FIG. 14, the product location map can characterize 2D environment position, but may alternatively create a product location map with 3D mapping, descriptive locations, or other formats for representing locations. As shown in FIG. 15, the product location map can similarly resolve specific product locations on a shelf. The product location map is preferably a data model that may be used. In some cases, the product location map may be a data model that can be queried and used.

Translating the candidate product location dataset into a product location can be used in outputting various results.

In one variation, the method involves outputting a product prediction for a given location. A data request can be received and processed with location descriptor. It could be a point, a region, or any type of descriptor related to location in the environment. In response, the method can involve querying the candidate product location dataset synthesizing probable location markers in proximity to the location descriptor and identifying a product prediction. For a point location, this can involve accessing nearby location markers and scoring them to determine a prioritized list of product predictions. For a region, this may involve accessing location markers within the region and optionally within some distance threshold from the region and scoring them to determine a prioritized list of product predictions. The location markers can be distance weighted such that those nearer the location descriptor are valued more. The location markers may additionally be time weighted such that more recent location markers may be given more value than older location markers. Additionally, the scores of the location markers may additionally be incorporated into the product prediction.

A single product maybe output. Alternatively, a list of possible products may be outputted along with their associated confidence scores (or other suitable metrics). In cases, where a region is queried, then there may be a list of products contained within that region. In one example, a whole aisle could be queried, and the result could be a list of all products predicted to be in that aisle.

In another variation, the method involves outputting a full product location map with data on product location predictions for an entire environment product prediction for a given location. This can use similar techniques above, where product predictions are generated for locations across an entire store. In some variations, clustering of location markers may be used to determine regions where a product is displayed. Other suitable forms of analysis may alternatively be used.

In another variation, the method involves outputting a likely location or locations for a queried product identifier. In this variation, a product identifier is received as part of a data query. In response, location markers associated with the product identifier are accessed, and the clustering of the location markers is analyzed to determine predicted locations. These clusters can be scored using confidence scores, time weighting, and other aspects like the number of location markers to determine confidence of a product being located at a storage location. Clustering of large number of recent high values location markers will generally indicate a likely location. This location reporting may additionally include inspecting location markers are similar locations to determine if other location markers indicate other products are more likely to be located at a storage location. For example, if a product was recently moved, newer location markers of a different product may indicate that this location is no longer being used.

The translation of candidate product location dataset into a product location map may be continually performed. Product placement may be constantly changing as products run out, new products are introduced, seasons change, and/or as the result of other changes within the store. The translation of candidate product location data into a product location may include decaying or weighing information by recency, which preferably involves amplifying (or otherwise emphasizing) recent data and/or deamplifying (or deemphasizing) older data. Seasonal patterns may additionally be factored into the modeling and updating of the product location map. As another variation, data from other environments (e.g., other retail locations) may also be used in refining or supplementing a product location map and/or the candidate product location data. These and other techniques may be used to make the method resilient to changes in product location.

The method may additionally apply the product location map for various applications. The product location map may be used as an automated planogram. The product location map may be used to augment a CV monitoring system by supplying expected product identity for a given location in the environment. The product location map may also be used in various operational tools such as detecting when inventory is low, when products are misplaced, and/or other. Other related inventory analytical tools may also be combined with such a product location map. For example, a service could monitor shelving tidiness and pair that with the product location map for reporting the shelving tidiness of specific products. As yet another application, the product location map can be used in the automated collection of image data for a given product and training or updating of a CV model with image data that is automatically labeled through this method. As another application, the product location map can be used in various interactive features. For example, a searchable product map of a store could be generated and used to provide highly detailed directions for finding specific product.

As one example, the product location map can be used in enabling a dynamic and self-updated map. A product location map can be presented as a viewable digital map within a user interface. Users could zoom in and out and see locations of different products. This may be used in providing automated store navigation instructions. For example, given a shopping list an optimized path through the store can be presented using the product location map. A digital product location map may also be queried and searched. Searches can use inspection of the candidate product location dataset or use a pregenerated product location map.

As another example, the product location map can be used for inventory alerts such as out of stock alerts, misplaced item alerts, alignment with product layout objectives, and the like.

As a related example, analysis of the candidate product location map may additionally or alternatively be sed in reporting on the state of a product location map. Locations with low confidence/data can be reported, new products can be detected, products with low confidence location data can be reported, and/or other conditions can be detected. In some cases, alerts may be trigged so that various actions like product scanning events can be performed to facilitate resolution of the issues.

As another example, the product location map may enable highly accurate 3D product mapping capabilities within a retail environment. This may be used in combination with augmented reality (AR) computing devices to enable various AR or other types of digital experiences based on relative position of a device (or user) with the products. For example, product information can be overlaid as an augmented reality layer, where positioning of the overlay is based in part on the product location map.

As another example, the product location map may be used in various CV-based applications. CV-based applications can include store monitoring services, operational-focused applications, customer-focused applications, and/or other forms of CV-based applications.

In particular, the method may include, as part of analysis of an automated checkout system, detecting a user-item interaction event, and for a location of the user-item interaction event querying the product location map (or alternatively the candidate product location dataset) in determining a product identity.

In some variations, computer vision identification of products may be used within the method to augment creating and/or maintaining a product location map.

Figure 16:
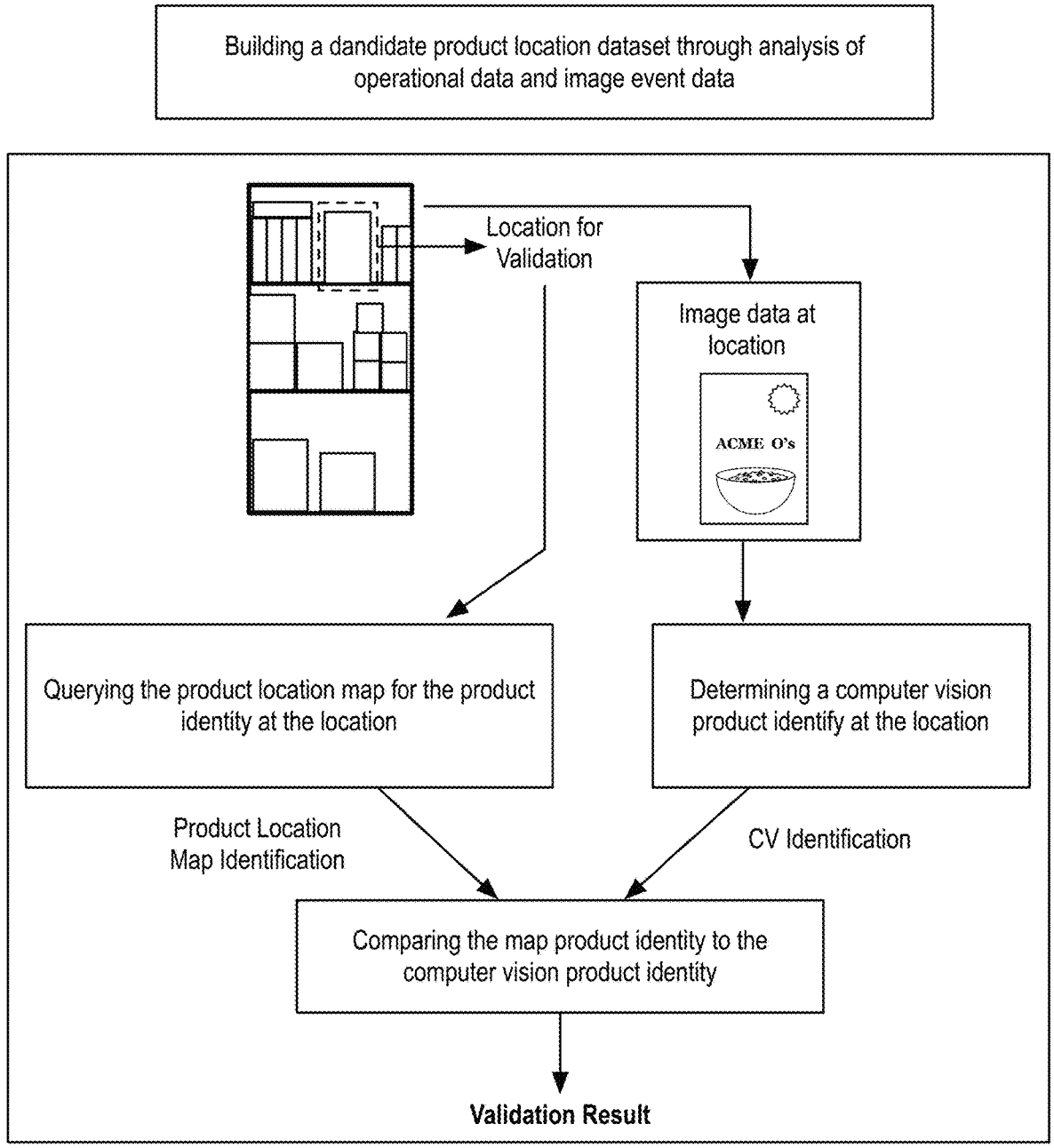
FIG. 16 is a schematic representation of using computer vision validation.

In one variation, CV product classification of the image data may be used in validating product identification. In some cases, the product map may be used as a check to validate CV product classification. In other cases, the CV product classifications may be used as a check to validate the product location map. In such a variation, the method, as shown in FIG. 16, may further include querying the product location map for the product identity at a first location; determining, using a computer vision product classifier model, a computer vision product identify at the first location; and comparing the map product identity to the computer vision product identity. If a result of the comparison matches, then the confidence in the CV product classification and/or the product location map may be validated. If the result of the comparison indicates misalignment, then some action may be initiated to resolve the issues. Misalignment could result in updating of the CV product classifier model. Misalignment could result in updating the related location markers for lower confidence or issuing some alert to resolve an issue with the product location map.

In another approach that doesn't use product classification, background image changes can be monitored through periodic inspection of the image data. In particular background image changes for a region that had a high confidence product location prediction may signal a change in stocking. This may be used to automatically alter location markers (expiring them, lowering their scores, etc.).

Figure 17:
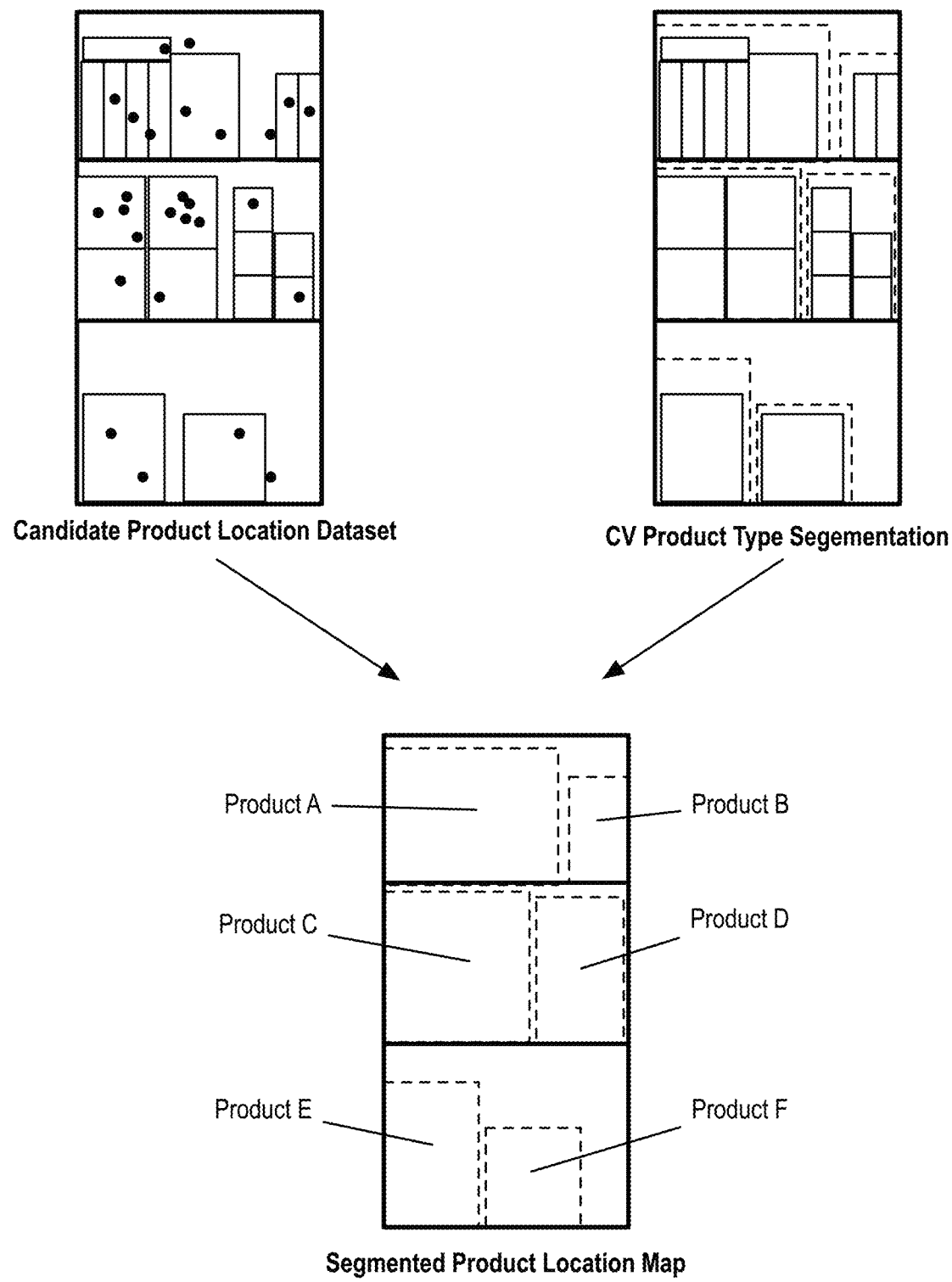
FIG. 17 is a schematic representation of using computer vision product type segmentation in enhancing product location map.

Computer vision analysis of the image data may additionally be used in refining the mapping of product locations. In some cases, automated image segmentation can be applied on the stocking of products to determine the product stocking regions within the environment. This segmentation preferably creates segments defining regions where the same type of product is displayed. This may be used in producing a more accurate reflection of the expected product location information. Accordingly, as shown in FIG. 17, translating the candidate product location dataset into a product location map can include: segmenting, using a product grouping computer vision segmentation model, regions of the image data into regions of similar product types; and assigning product locations by analyzing probable product location markers with locations in spatial proximity to each region. This segmentation can be performed to detect if and when bounds of product stocking change. If bounds change then this may trigger updates to the product location map. For example, a product location map update can be triggered if product X has its shelf space expand one column while adjacent product y shelf space contracts or shifts by one column.

There are many variations and options in which the method may be implemented. As described two main variations involve a transaction data focused variation and an on-site product scanning variation. Another related variation can involve instances of updating the candidate product location dataset with transaction data derived location markers and product scanning event derived location markers.

As shown in FIG. 7, a method variation for use with transaction data may include: at a point of sale (POS) terminal device, reading (scanning) a product identifier (e.g., scanning a machine readable code) S212; communicating, to a computing device of an inventory monitoring system, a transaction log that includes the product identifier and a timestamp S214; collecting image data S222; detecting, using a computer vision processing model, product event location data S224; identifying a set of product shelf events in the image event location data that satisfy an association condition for the transaction log S232; storing the set of product shelf events as probable location points of the product identifier in a candidate product location dataset S234; and translating the candidate product location dataset into a product location map S240.

The use of transaction data described as it is applied within a iterative process can include: progressively updating a candidate product location dataset that stores a plurality of probable product location markers, which comprises multiple instances of: at a point of sale (POS) terminal device, scanning a machine-readable product code and reading a product identifier; at the POS terminal device, communicating, to a computing device of an inventory monitoring system, the product identifier as part of a transaction log that includes a list of product identifiers and a timestamp; at a set of imaging devices, collecting image data, wherein the set of imaging devices are configured to capture a field of view that includes product storage locations; detecting, using a computer vision processing model, product event location data at the product storage locations; at the inventory monitoring system, identifying a set of product event locations in the product event location that satisfy an association condition for the transaction log, and, at the inventory monitoring system, updating the candidate product location dataset with a set of probable product location markers that each associate a location property of one of the set of product event locations with the product identifier.

When the candidate product location dataset is sufficiently updated with probably location markers, then the method may proceed to translating the candidate product location dataset into a product location map.

As discussed herein, one technique of identifying a set of product event locations to match to a product identifier in a transaction log can involve scoping by customer. In this way, updating the candidate product location dataset may further involve detecting, through a person detection computer vision processing model, a user in proximity to the POS terminal device during a time of the timestamp; and where identifying a set of product event locations in the product event location that satisfy an association condition for the transaction log includes identifying a set of product event locations in the product event location data that are associated with the user. The user in proximity to the POS terminal device may be detected by detecting or accessing location of the terminal device and searching for users in a customer region defined near the POS terminal device.

As also discussed herein, use of transaction data may further involve selective analysis of receipts. In this way, identifying a set of product event locations for a transaction log (e.g., matching the product identifier to at least one product event location) may be conditionally performed if the list of product identifiers of the transaction log satisfies a mapping condition. As discussed herein, various selective processes may be used, which could depend on the number of items in the receipt, the conditions of other related receipts. The current location markers stored for a product identifier, and the other conditions.

As shown in FIG. 8, a method variation for use with scanning event data may include: at a product scanning device, reading a product identifier (e.g., scanning a machine readable code) S312; communicating, to a computing device of an inventory monitoring system, the product identifier as part of a product scanning event S314; collecting image data during a defined product locating time window of the product scanning event S322; for the scanning event, detecting, by processing the image data using a computer vision processing model, a product shelf event S324; adding, to a candidate product location dataset, a probable location marker associating a location of the product shelf event to the product identifier S332; storing the set of product shelf events as probable location points of the product identifier in a candidate product location dataset S334; and translating the candidate product location dataset into a product location map S340.

The use of product scanning events described as it is applied within a iterative process can include: progressively updating a candidate product location dataset that stores a plurality of probable product location markers, which comprises multiple instances of: at a portable product scanning device, scanning a machine-readable product code and reading a product identifier; at the portable product scanning device, communicating, to a computing device of an inventory monitoring system, the product identifier as part of a product scanning event; at a set of imaging devices, collecting image data during a defined product locating time window of the product scanning event, wherein the set of imaging devices are configured to capture a field of view that includes product storage locations; detecting, using a computer vision processing model, product event location data at the product storage locations; at the inventory monitoring system, matching the product identifier to at least one product event location in the product event location data; and at the inventory monitoring system, updating the candidate product location dataset with a probable product location marker that associates a location property of the product event location and the product identity. When the candidate product location dataset is sufficiently updated with probably location markers, then the method may proceed to translating the candidate product location dataset into a product location map.

The defined product locating time window may be configured to be a time window preceding.

The product scanning variations above, may make use of location scoping to find and/or limit product event location data to location indicating activity in proximity to the scanning event. Accordingly, such a variation matching the product identifier to at least one product event location in the product event location data may include matching the product identifier to a product event location in proximity to the location of the product scanning device. Being in proximity may be conditional on being within a set displacement, being within the same region, being present within the same field of view of a camera, being present within a set of camera views. For example, a scanning event may trigger matching the product identifier to a product event location within three cameras covering a region at or adjacent to the location of the scanning event.

In a related variation, in connection with updating the candidate product location dataset, the method may include detecting location of the product scanning device. This may involve sensing location using a location service like GPS, RF triangulation, and the like. This may alternatively include detecting the product scanning device location by detecting a visual identifier of the product scanning device in the image data.

As another variation, matching the product identifier to at least one product event location may involve temporally scoping product event locations. In general, the product event locations that should be associated with a scanning event will either be directly before, during, or after.

In this way matching may involve matching the product identifier to at least one product event location preceding a time of the product scanning event. This may be the product event location right before (and optionally within some spatial scope of the scanning event). This may alternatively be multiple product event locations within some defined time window.

This may alternatively include matching the product identifier to at least one product event location detected during a time of the product scanning event. For example, scanning a product may also trigger identifying a product event (e.g., an identifier) in proximity to the scanning device.

This may alternatively include matching the product identifier to at least one product event location proceeding a time of the product scanning event. This may be the product event location right after (and optionally within some spatial scope of the scanning event). This may alternatively be multiple product event locations within some defined time window after.

In some variations, the duration of the time window may be defined by successive scanning events such that locations can be determined from the image data during time windows between a sequence of product scanning events. This may be particularly useful when stocking as it could track full stocking regions when multiple instances of one product are placed on a shelf. For example, a worker scans a product that is being stocked, then places a crate of that product on the shelf, possibly arranging it so that there are multiple columns and stacks of the item. All these regions can be detected through processing the image data (e.g., using a background image change process). Every location where the product was stocked may be associated with that product identifier.

In another variation, matching may involve receiving a locating time window signal that indicates when a product event location is expected. For example, a user interface element on the product scanning device may allow an operator to trigger when to check capture the product location. For example, a worker scans a product, then holds a visual identifier at the location of the product and then hits a location capture button input, the CV system detects the location of the visual identifier—resulting in high confidence product identifier to location marking in an easily executed process.

Figure 19:
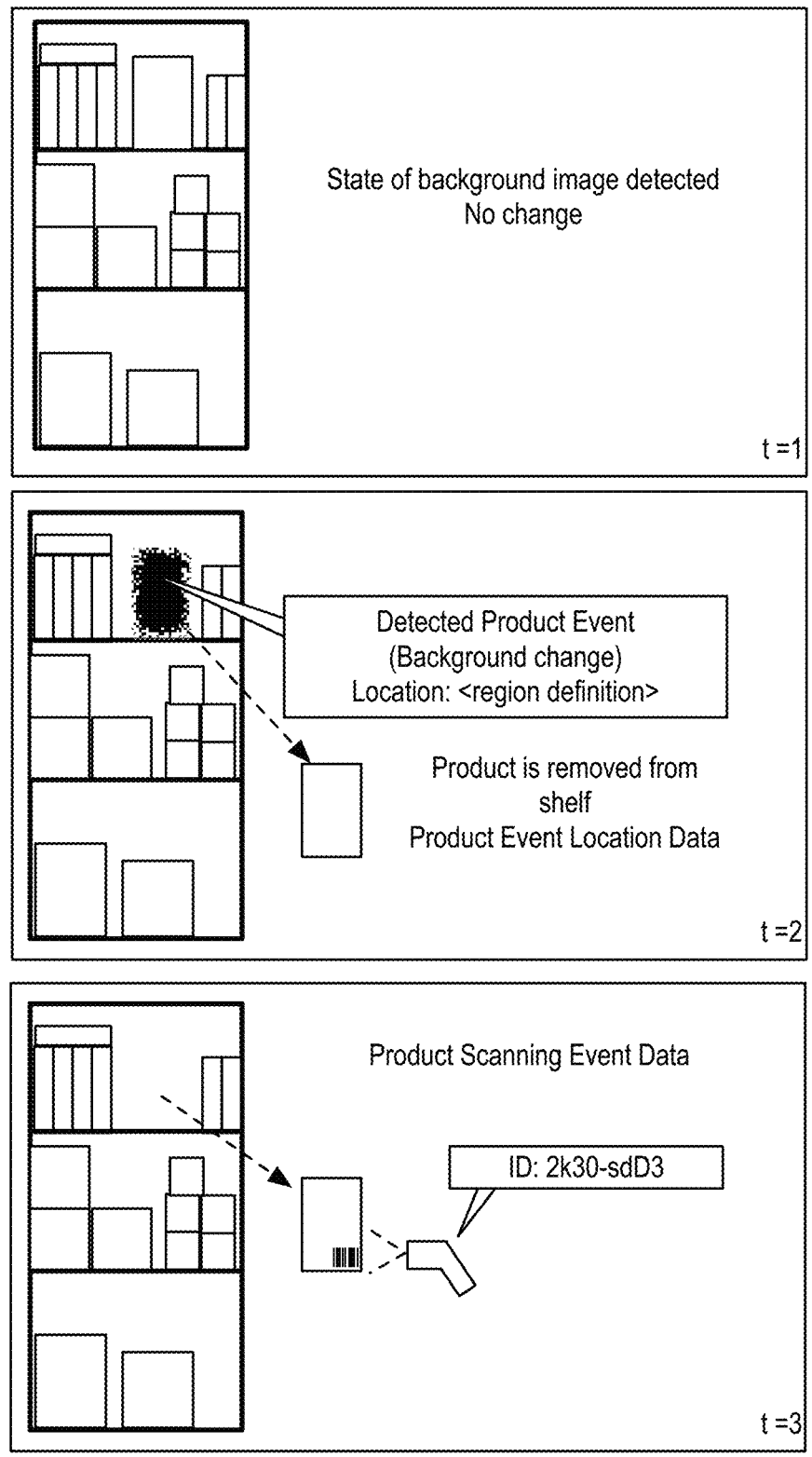
FIG. 19 is a schematic representation of a sequence of events for collecting associated product event location data and then a product scanning event data.
Figure 20:
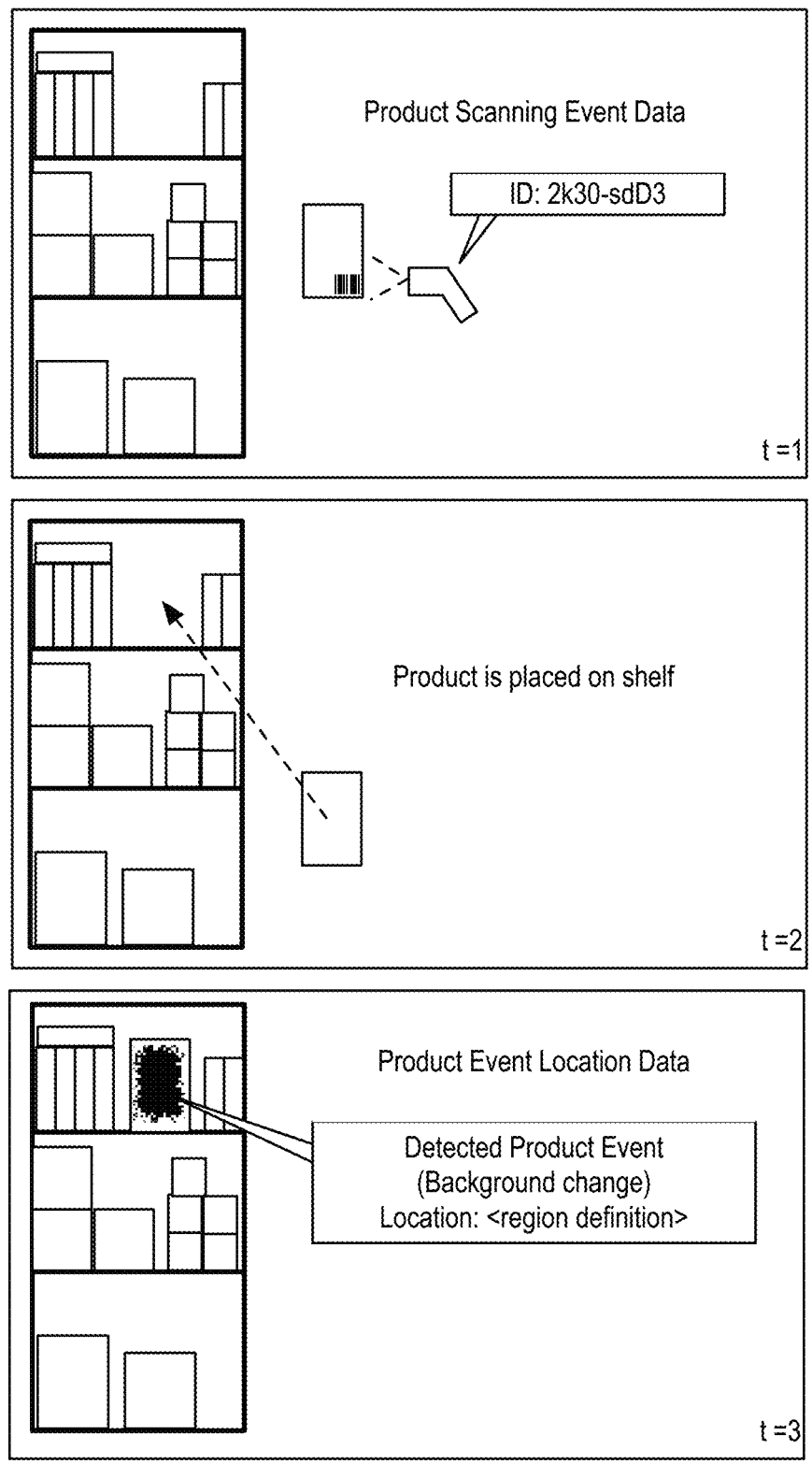
FIG. 20 is a schematic representation of a sequence of events for collecting associated a product scanning event data and then product event location data.

The product event locations may be detected in a variety of ways. Detecting "shelf" changes or product storage changes is one preferred technique. In one variation, detecting product event location data comprises removing foreground objects of the image data thereby forming background object image data, and detecting changes in the background object image data. This can be applied to detecting removal of a product before a scanning event (taking the product down to scan) as shown in FIG. 19. This may alternatively be applied to detecting placement of a product after the scanning event (scanning the product and then placing the product in its storage location) as shown in FIG. 20.

Figure 21:
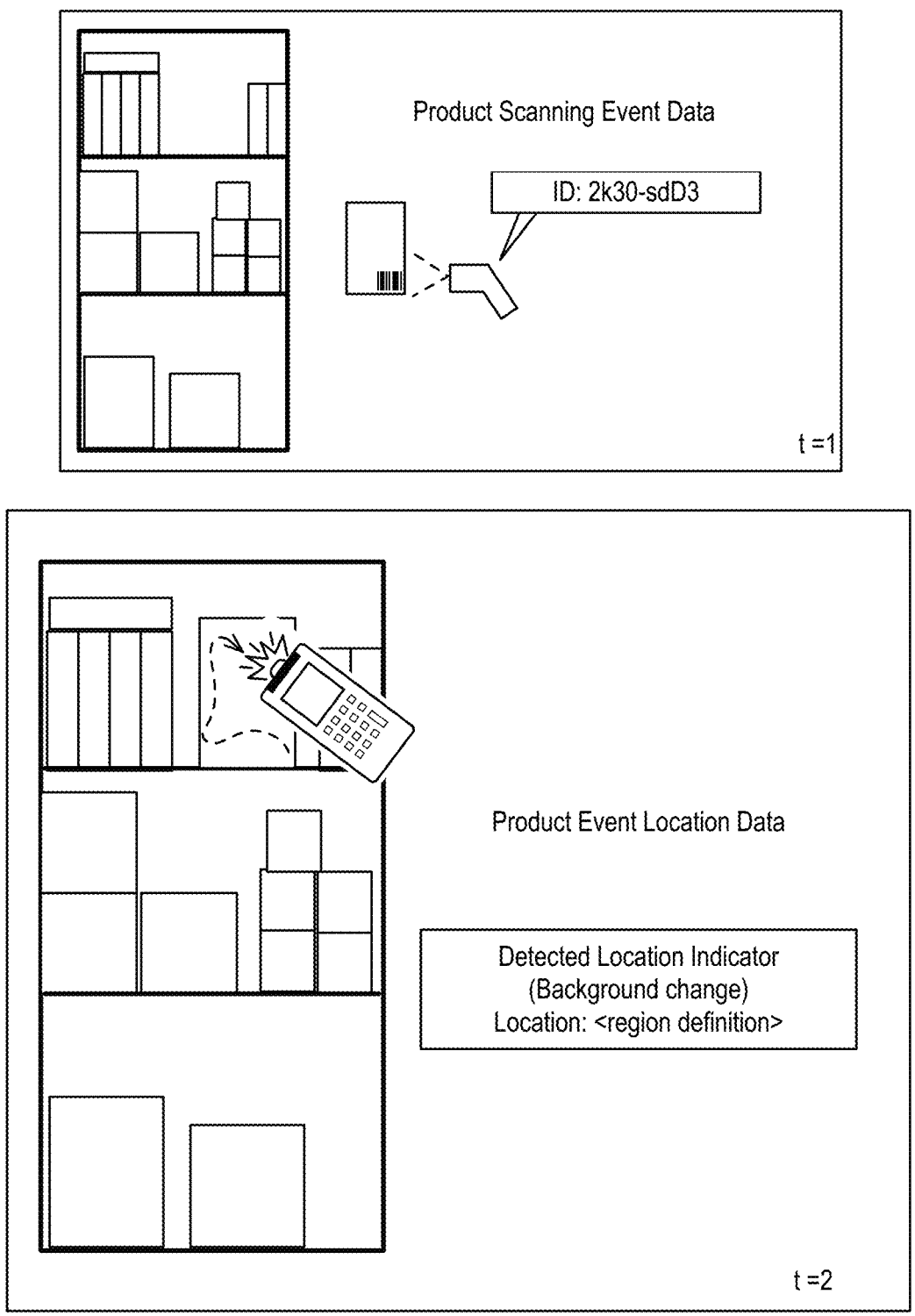
FIG. 21 is a schematic representation of a sequence of events for collecting associated a product scanning event data and using a visual identifier to set product event location data.

In some variations, as indicated above, a visual identifier may be used tool for marking locations of a product as shown in FIG. 21. In such a variation, detecting product event location data can include detecting a visual identifier during a product locating time window. In some instances, the visual identifier may be a separate object. In other instances, the visual identifier of the product scanning. Matching the product identifier to a product event location in the product event location data may then include using location of the visual identifier as the location matched to the product identifier. A probable location marker then associates this location to the product identifier.

In some instances, the visual identifier may be a graphic displayed on a screen of the product scanning device. The visual identifier may be a static recognizable graphic (fiducial marker). The visual identifier may alternatively be unique or identifying. The encoded identifier of the visual identifier could be associated with the scanning device (to avoid confusion to other scanning devices). The encoded identifier of the visual identifier may alternatively be dynamically generated and unique to the scanning event.

In one variation, the visual identifier can be an emitted time-variable visible signal. This may be implemented by emitting a time varying light signal. This signal could be detected by the cameras. In some instances, this light signal could be an IR light signal that can be detected through IR sensitive imaging devices. In this way, detecting a product event location may include, during a product locating time window, emitting the visual identifier as a time-variable visible signal.

In another variation of the visual identifier, detecting product event location data may include tracking the location of the visual identifier in identifying a defined location region. For example, the visual identifier may be moved by an operator in front of the region. In one implementation, the visual identifier can be activated and deactivated in response to a user control. Detecting of the visual identifier can mark location points used to define the bounds of a location region. For example, a worker could mark the corners of a rectangle defining the shelf space of a product by activating the visual identifier (hitting a button that triggers display of the identifier) at each corner.

In some variations, the scanning event variations may make use of the fact that a user is actively using the scanning device and provide feedback as to the state of the product locating process. In this way the method may include: in response to updating the candidate product location dataset with a probable product location marker, communicating product location feedback to the product scanning device, which is presented on the product scanning device. The product location feedback may be confirmation of completing the locating process. The feedback could, for example, be a visual, tactile, or audio alert indicating completion of locating the product. The feedback may alternatively indicate an error or issue which would indicate the process may need to be repeated.

Figure 18:
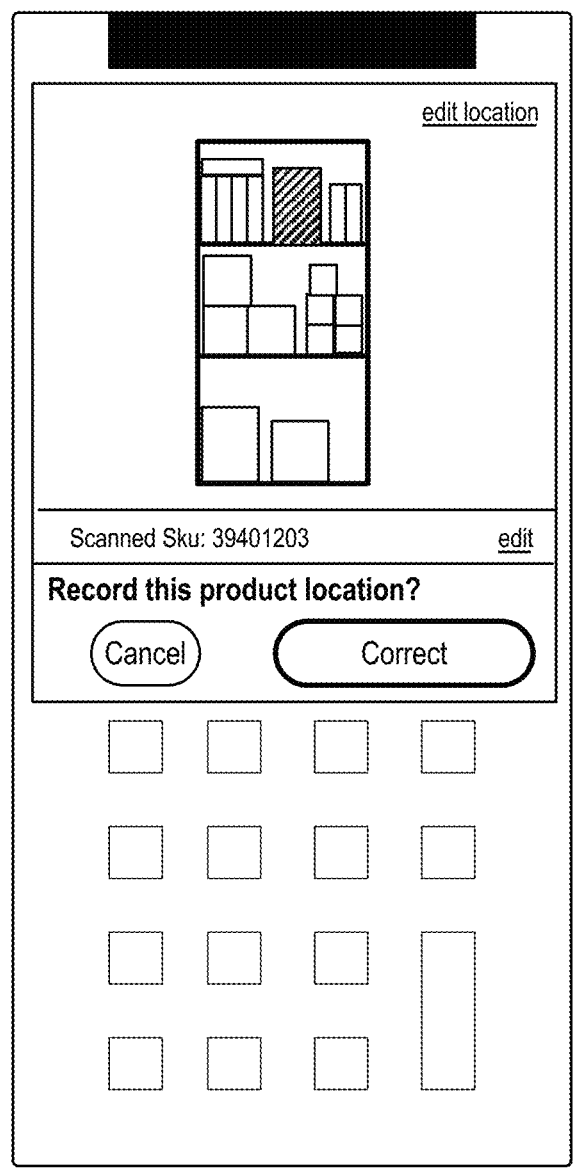
FIG. 18 is a schematic representation of a product scanning device receiving feedback.

In some cases, visual feedback and user confirmation may be incorporated into the process. In this variation, communicating product location feedback to the product scanning device may include: communicating a descriptor of the detected location to the product scanning device; presenting the descriptor through a user interface output of the product scanning device, and receiving user confirmation as shown in FIG. 18. In response to positive user confirmation, a corresponding probable location marker can be stored. In response to a negative user confirmation, the user interface and the method may repeat detection of product event location, entry of operational data, cancel the creation of a new probable location marker, and/or take any suitable action.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums (e.g., a non-transitory computer-readable medium) storing instructions that, when executed by the one or more computer processors, cause a computing platform to perform operations comprising those of the system or method described herein such as: collecting operational data with item identifier information S10, generating item event location data through a sensor monitoring system S20, processing the operational data and establishing a candidate item location dataset using item event location data associated with the operational data S30, and translating the candidate item location dataset into an item location map S40.

Figure 22:
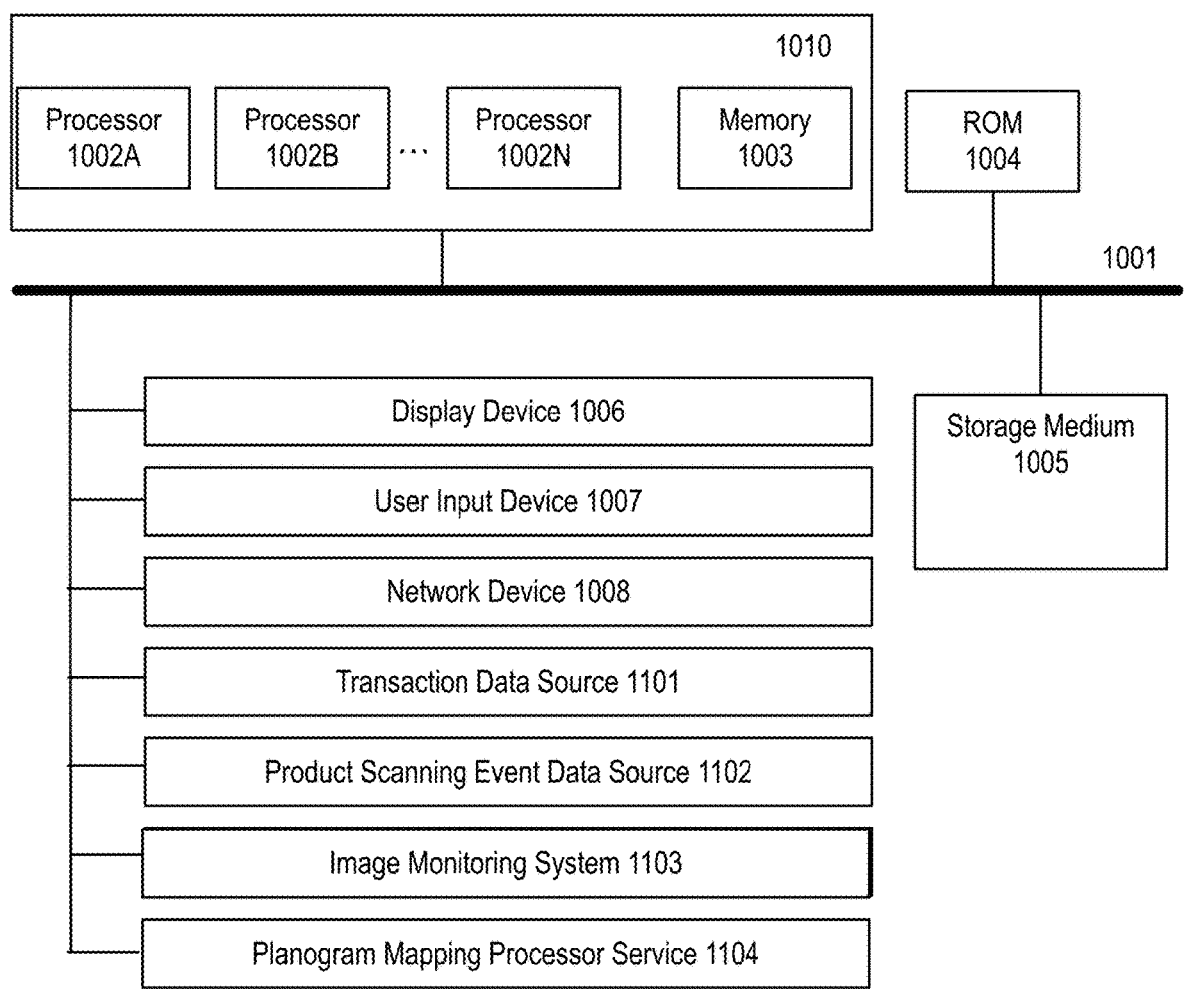
FIG. 22 is an exemplary system architecture that may be used in implementing the system and/or method.

FIG. 22 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting a transaction data source 1101, a product scanning event data source 1102 image monitoring system 1103, planogram mapping processor service 1104, and/or other suitable computing devices.

The processors 1002A-1002N may take many forms, such as CPUs (Central Processing Units), GPUS (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A method for automated product location tracking within an environment comprising:
    progressively updating a candidate product location dataset that stores a plurality of probable product location markers, which comprises multiple instances of:
        at point of sale terminal device, creating a transaction log that includes a timestamp and a set of product identifiers resulting from scanning a set of machine readable product codes during checkout,
        at the point of sale terminal device, communicating, to a computing device of an inventory monitoring system, the transaction log,
        at a set of imaging devices, collecting image data, wherein the set of imaging devices are configured to capture a field of view that includes product storage locations, wherein each imaging device of the set of imaging devices is mounted with an aerial view from overhead in the environment,
        detecting, by processing the image data using a computer vision processing model, product event location data at the product storage locations,
        at the inventory monitoring system, identifying product event location data that satisfies an association condition for the transaction log and thereby matching a subset of the set of product identifiers in the transaction log to at least one product event location in the product event location data, and
        at the inventory monitoring system, updating the candidate product location dataset with at least one probable product location marker that associates the subset of the set of product identifiers to the at least one product event location; and
    translating the candidate product location dataset into a product location map based on patterns of a set of probable product location markers.

2. The method of claim 1, wherein detecting product event location data comprises removing foreground objects of the image data thereby forming background object image data, and detecting changes in the background object image data, wherein product event location data includes locations of changes in the background object image data.

3. The method of claim 1, wherein an instance of updating the candidate product location dataset further comprises: detecting, through a person detection computer vision processing model, a user in proximity to the point of sale terminal device during a time of the timestamp of the transaction log; and wherein identifying a set of product event locations in the product event location that satisfy an association condition for the transaction log comprises identifying a set of product event locations in the product event location data that are associated with the user.

4. The method of claim 1, wherein matching the product identifier to at least one product event location in the product event location data is performed if the list of product identifiers of the transaction log satisfies a mapping condition.

5. The method of claim 1, translating the candidate product location dataset into a product location map comprises: segmenting, using a product grouping computer vision segmentation model, regions of the image data into regions of similar product types; and assigning product locations by analyzing probable product location markers with locations in spatial proximity to each region.

6. The method of claim 1, further comprising, querying the product location map for the product identity at a first location; determining, using a computer vision product classifier model, a computer vision product identify at the first location, and comparing the map product identity to the computer vision product identity.

7. The method of claim 1, wherein translating the candidate product location dataset into the product location map based on patterns of the set of probable product location markers is further based on patterns of the set of probable product location markers from multiple transaction logs.

8. The method of claim 1, further comprising: detecting, through processing the image data using a person detection computer vision processing model, a first user in proximity to the point of sale terminal device during a time of the timestamp of the transaction log; wherein the product event location data is associated with a second user; and wherein the association condition is based on when the first user of the transaction log and second user of the product event location data correspond to the same user.

9. The method of claim 1, wherein the association condition is based on correspondence of the timestamp of the transaction log to a time of the product event location data.

10. The method of claim 1, wherein detecting product event location data comprises processing the image data with a customer-item interaction classifier model and detecting a customer-item interaction event.

11. The method of claim 10, wherein the customer-item interaction event is an item pick up event with location information.

12. The method of claim 1, wherein detecting product event location data comprises processing image data and detecting product event locations of changes in product shelving.

13. The method of claim 1, wherein detecting product event location data comprises processing the image data and detecting paths of users.

14. The method of claim 13, wherein the patterns of a set of probable product location markers may include a pattern of the overlap of multiple paths of users associated with a given product identifier.

15. A non-transitory computer-readable medium storing instructions that, when executed by one or more computer processors of a computing platform, cause the computing platform to:
    updating a candidate product location dataset that stores a plurality of probable product location markers, which comprises multiple instances of:
        at point of sale terminal device creating a transaction log that includes a timestamp and a set of product identifiers resulting from scanning a set of machine readable product codes during checkout,
        at the point of sale terminal device, communicating, to a computing device of an inventory monitoring system, the transaction log,
        at a set of imaging devices, collecting image data, wherein the set of imaging devices are configured to capture a field of view that includes product storage locations, wherein each imaging device of the set of imaging devices is mounted with an aerial view from overhead in the environment,
        detecting, by processing the image data using a computer vision processing model, product event location data at the product storage locations, at the inventory monitoring system, identifying product event location data that satisfies an association condition for the transaction log and thereby matching a subset of the set of product identifiers in the transaction log to at least one product event location in the product event location data, and at the inventory monitoring system, updating the candidate product location dataset with at least one probable product location marker that associates the subset of the set of product identifiers to the at least one product event location; and translating the candidate product location dataset into a product location map based on patterns of a set of probable product location markers.

16. A system for automated product location tracking within an environment comprising of:

a point of sale terminal device including a product scanning system;

one or more non-transitory computer-readable mediums storing instructions that, when executed by the one or more computer processors, cause a computing platform to perform operations comprising:

updating a candidate product location dataset that stores a plurality of probable product location markers, which comprises multiple instances of:

at the point of sale terminal device, creating a transaction log that includes a timestamp and a set of product identifiers resulting from scanning a set of machine readable product codes during checkout, at the point of sale terminal device, communicating, to a computing device of an inventory monitoring system, the transaction log, at a set of imaging devices, collecting image data, wherein the set of imaging devices are configured to capture a field of view that includes product storage locations, wherein each imaging device of the set of imaging devices is mounted with an aerial view from overhead in the environment, detecting, by processing the image data using a computer vision processing model, product event location data at the product storage locations, at the inventory monitoring system, identifying product event location data that satisfies an association condition for the transaction log and thereby matching a subset of the set of product identifiers in the transaction log to at least one product event location in the product event location data, and at the inventory monitoring system, updating the candidate product location dataset with at least one probable product location marker that associates the subset of the set of product identifiers to the at least one product event location; and translating the candidate product location dataset into a product location map based on patterns of a set of probable product location markers.

\* \* \* \* \*